United States Patent
Hovers et al.

(10) Patent No.: US 7,826,854 B2
(45) Date of Patent: *Nov. 2, 2010

(54) METHOD AND APPARATUS FOR SMART BEAM SELECTION IN A SMART ANTENNA SYSTEM

(76) Inventors: Omri Hovers, 9 Bosel, Petah Tikva (IL); Shahar Kagan, Ezra, Number 2, Nes-Chiyona (IL); Eran Shenhar, Yaaf 3, Doar Na Sharon Tichon 45886 (IL)

(*) Notice: Subject to any disclaimer, the term of this patent is extended or adjusted under 35 U.S.C. 154(b) by 0 days.

This patent is subject to a terminal disclaimer.

(21) Appl. No.: 12/239,094

(22) Filed: Sep. 26, 2008

(65) Prior Publication Data
US 2009/0143073 A1  Jun. 4, 2009

Related U.S. Application Data

(63) Continuation of application No. 11/514,282, filed on Aug. 30, 2006, now Pat. No. 7,444,157, which is a continuation of application No. 10/124,541, filed on Apr. 16, 2002, now Pat. No. 7,289,826.

(51) Int. Cl.
H04W 72/00 (2009.01)
H04M 1/00 (2006.01)

(52) U.S. Cl. .............. 455/452.2; 455/550.1; 455/562.1; 342/372

(58) Field of Classification Search .............. 455/562.1, 455/452.2, 550.1; 342/368
See application file for complete search history.

(56) References Cited

U.S. PATENT DOCUMENTS

| | | | |
|---|---|---|---|
| 2,848,714 A | 8/1958 | Ring | |
| 3,806,804 A | 4/1974 | Mills et al. | |
| 4,125,745 A | 11/1978 | Steidl | |
| 4,249,181 A | 2/1981 | Lee | |
| 4,449,248 A | 5/1984 | Leslie et al. | |
| 4,520,476 A | 5/1985 | Searl | |

(Continued)

FOREIGN PATENT DOCUMENTS

EP   0431956 A2   6/1991

(Continued)

OTHER PUBLICATIONS

Robert J. Mailloux, Phased Array Antenna Handbook, Artech House, Inc., 1994, pp. 13-20 and 438-445 and 521-524.

(Continued)

*Primary Examiner*—William D Cumming
(74) *Attorney, Agent, or Firm*—McDonnell Boehnen Hulbert & Berghoff LLP

(57) ABSTRACT

A method of beam selection in a smart antenna system is provided. The method includes receiving a plurality of uplink beams by a plurality of receivers, each corresponding with one of the plurality of uplink beams. Each uplink beam includes signals transmitted by a mobile station. The method further includes analyzing each of the plurality of uplink beams and selecting an uplink beam from the plurality of uplink beams based at least in part on the analysis of the uplink beams. The method further includes switching to the selected beam in real time to allow the signals communicated in the selected beam to be communicated to a base station transceiver.

20 Claims, 18 Drawing Sheets

U.S. PATENT DOCUMENTS

| | | |
|---|---|---|
| 4,626,858 A | 12/1986 | Copeland |
| 4,641,365 A | 2/1987 | Montini |
| 4,714,928 A | 12/1987 | Schmitt |
| 4,792,813 A | 12/1988 | Rosen |
| 4,819,227 A | 4/1989 | Rosen |
| 4,823,341 A | 4/1989 | Rosen |
| 4,827,268 A | 5/1989 | Rosen |
| 4,831,619 A | 5/1989 | Rosen |
| 4,858,229 A | 8/1989 | Rosen et al. |
| 4,875,038 A | 10/1989 | Siwiak et al. |
| 4,879,711 A | 11/1989 | Rosen |
| 4,882,588 A | 11/1989 | Renshaw et al. |
| 4,952,193 A | 8/1990 | Talwar |
| 5,039,994 A | 8/1991 | Wash et al. |
| 5,073,971 A | 12/1991 | Schaeffer |
| 5,111,197 A | 5/1992 | Ichikawa |
| 5,140,611 A | 8/1992 | Jones et al. |
| 5,230,084 A | 7/1993 | Nguyen |
| RE34,410 E | 10/1993 | Rosen |
| 5,304,998 A | 4/1994 | Lopez |
| 5,345,243 A | 9/1994 | Levis |
| RE34,796 E | 11/1994 | Smith et al. |
| 5,369,681 A | 11/1994 | Boudreau et al. |
| 5,376,975 A | 12/1994 | Romero et al. |
| 5,404,569 A | 4/1995 | Schwendeman et al. |
| 5,426,633 A | 6/1995 | Tanaka et al. |
| 5,432,780 A | 7/1995 | Smith et al. |
| 5,448,751 A | 9/1995 | Takenaka et al. |
| 5,485,633 A | 1/1996 | Burke et al. |
| 5,530,437 A | 6/1996 | Goldberg |
| 5,530,918 A | 6/1996 | Jasinski |
| 5,535,423 A | 7/1996 | Dupuy |
| 5,546,464 A | 8/1996 | Raith et al. |
| 5,550,554 A | 8/1996 | Erkocevic |
| 5,576,717 A | 11/1996 | Searle et al. |
| 5,596,318 A | 1/1997 | Mitchell |
| 5,596,333 A | 1/1997 | Bruckert |
| 5,633,649 A | 5/1997 | Grossi et al. |
| 5,648,784 A | 7/1997 | Benedicto Ruiz et al. |
| 5,648,827 A | 7/1997 | Shaw |
| 5,724,666 A | 3/1998 | Dent |
| 5,726,640 A | 3/1998 | Jones et al. |
| 5,734,963 A | 3/1998 | Fitzgerald et al. |
| 5,742,911 A | 4/1998 | Dumbrill et al. |
| 5,760,705 A | 6/1998 | Glessner et al. |
| 5,771,026 A | 6/1998 | Stengel |
| 5,784,031 A | 7/1998 | Weiss et al. |
| 5,786,763 A | 7/1998 | Canipe |
| 5,790,940 A | 8/1998 | Laborde et al. |
| 5,796,779 A | 8/1998 | Nussbaum et al. |
| 5,797,084 A | 8/1998 | Tsuru et al. |
| 5,806,003 A | 9/1998 | Jolma et al. |
| 5,812,933 A | 9/1998 | Niki |
| 5,815,798 A | 9/1998 | Bhagalia et al. |
| 5,822,684 A | 10/1998 | Kitakubo |
| 5,828,949 A | 10/1998 | Silver et al. |
| 5,857,155 A | 1/1999 | Hill et al. |
| 5,870,426 A | 2/1999 | Yokev et al. |
| 5,870,681 A | 2/1999 | Myer |
| 5,883,886 A | 3/1999 | Eaton et al. |
| 5,889,494 A | 3/1999 | Reudink et al. |
| 5,907,816 A | 5/1999 | Newman et al. |
| 5,929,809 A | 7/1999 | Erlick et al. |
| 5,930,243 A | 7/1999 | Parish et al. |
| 5,930,729 A | 7/1999 | Khamis et al. |
| 5,937,333 A | 8/1999 | Sexton et al. |
| 5,956,621 A | 9/1999 | Weiss et al. |
| 5,966,371 A | 10/1999 | Sherman |
| 5,966,670 A | 10/1999 | Keskitalo et al. |
| 5,969,681 A | 10/1999 | O'Neill |
| 5,969,689 A | 10/1999 | Martek et al. |
| 5,995,049 A | 11/1999 | Komatsu et al. |
| 5,995,840 A | 11/1999 | Dorenbosch et al. |
| 6,005,854 A | 12/1999 | Xu et al. |
| 6,006,068 A | 12/1999 | Elkin et al. |
| 6,041,088 A | 3/2000 | McCallister |
| 6,078,295 A | 6/2000 | Rawle |
| 6,104,935 A | 8/2000 | Smith et al. |
| 6,104,936 A | 8/2000 | Kronestedt |
| 6,134,261 A | 10/2000 | Ryan |
| 6,167,286 A | 12/2000 | Ward et al. |
| 6,192,038 B1 | 2/2001 | Wallerius et al. |
| 6,201,511 B1 | 3/2001 | Xue |
| 6,201,955 B1 | 3/2001 | Jasper et al. |
| 6,215,443 B1 | 4/2001 | Komatsu et al. |
| 6,215,789 B1 | 4/2001 | Keenan et al. |
| 6,282,179 B1 | 8/2001 | Sherman |
| 6,285,313 B1 | 9/2001 | Wahab et al. |
| 6,341,213 B1 | 1/2002 | Wu |
| 6,738,016 B2 | 5/2004 | Li et al. |
| 6,771,219 B2 | 8/2004 | Sim |
| 6,782,036 B1 | 8/2004 | Dowling et al. |
| 6,782,244 B2 | 8/2004 | Steel et al. |
| 6,788,250 B2 | 9/2004 | Howell |
| 6,795,018 B2 | 9/2004 | Guo |
| 6,847,832 B2 | 1/2005 | Wong et al. |
| 6,950,416 B1 | 9/2005 | Feurstein et al. |
| 7,007,107 B1 | 2/2006 | Ivchenko et al. |
| 7,065,383 B1 * | 6/2006 | Hovers et al. ............ 455/562.1 |
| 7,072,580 B2 | 7/2006 | Arecco et al. |
| 7,109,919 B2 | 9/2006 | Howell |
| 7,113,780 B2 | 9/2006 | McKenna et al. |
| 7,289,826 B1 * | 10/2007 | Hovers et al. ............ 455/562.1 |
| 7,340,281 B2 | 3/2008 | Zeira et al. |
| 7,346,365 B1 * | 3/2008 | Hovers et al. ............ 455/550.1 |
| 7,349,721 B2 * | 3/2008 | Hovers et al. ............ 455/562.1 |
| 7,395,094 B2 * | 7/2008 | Hovers et al. ............ 455/562.1 |
| 7,418,271 B2 * | 8/2008 | Hovers et al. ............ 455/550.1 |
| 7,444,157 B2 * | 10/2008 | Hovers et al. ............ 455/562.1 |
| 7,463,906 B2 * | 12/2008 | Hovers et al. ............ 455/562.1 |
| 7,529,525 B1 * | 5/2009 | Hovers et al. ............... 342/372 |
| 7,555,315 B2 * | 6/2009 | Hovers et al. ............ 455/562.1 |
| 7,565,174 B2 * | 7/2009 | Hovers et al. ............ 455/562.1 |
| 2004/0142658 A1 | 7/2004 | McKenna et al. |
| 2006/0030365 A1 * | 2/2006 | Hovers et al. ............ 455/562.1 |
| 2007/0021117 A1 | 1/2007 | McKenna et al. |
| 2007/0054700 A1 * | 3/2007 | Hovers et al. ............ 455/562.1 |
| 2007/0054701 A1 * | 3/2007 | Hovers et al. ............ 455/562.1 |
| 2007/0093271 A1 * | 4/2007 | Hovers et al. ............ 455/562.1 |
| 2007/0093272 A1 * | 4/2007 | Hovers et al. ............ 455/562.1 |
| 2007/0111760 A1 * | 5/2007 | Hovers et al. ............ 455/562.1 |
| 2007/0161406 A1 * | 7/2007 | Hovers et al. ............ 455/562.1 |
| 2007/0161407 A1 * | 7/2007 | Hovers et al. ............ 455/562.1 |
| 2007/0195708 A1 | 8/2007 | Ward et al. |
| 2007/0291668 A1 | 12/2007 | Duan |
| 2008/0161056 A1 * | 7/2008 | Hovers et al. ............ 455/562.1 |
| 2008/0280622 A1 * | 11/2008 | Hovers et al. ............ 455/452.1 |
| 2009/0143073 A1 * | 6/2009 | Hovers et al. ............ 455/452.2 |
| 2009/0280867 A1 | 11/2009 | Hovers et al. |

FOREIGN PATENT DOCUMENTS

| | | |
|---|---|---|
| EP | 0531090 A2 | 3/1993 |
| EP | 0940934 A2 | 9/1999 |
| WO | 97/29557 A1 | 8/1997 |
| WO | 97/46039 A1 | 12/1997 |
| WO | 98/53560 A1 | 11/1998 |
| WO | 99/31820 A1 | 6/1999 |

OTHER PUBLICATIONS

C.A. Balanis, Antenna Theory Analysis and Design, Harper and Row Publishers, Inc., 1982, pp. 679-685 and 698-699.

Motorola, Inc., Semiconductor Technical Data, FLEXchip Signal Processor, Publication No. MC68175/D, 1996, 109 pages.

Motorola, Inc., FLEXstack One Way Software Development Kit, Version 2.0, Dec. 13, 1996, 66 pages.

Motorola, inc., Flexible High Speed Paging Protocol Benchmarking, Apr. 26, 1994, 16 pages.

Motorola, Inc., FLEX Protocol's Operational Capabilities for Local, Regional, Nationwide and Global Roaming—Preliminary, Jul. 18, 1995, 32 pages.

Motorola, Inc., Typical FLEX Pager Block Diagram with FLEXstack, Mar. 27, 1997, 1 page.

Texas Instruments, TMS320FLEX1 Chipset Product Brief, Mar. 27, 1997, 3 pages.

Texas Instruments Press Release, "TI Chip Set Supporting FLEX Messaging Protocol Now Available", Nov. 11, 1996, 2 pages.

Texas Instruments, TVL5591 Data manual for FLEX Decoder, Apr. 17, 1996, Appendix A and B, 22 pages.

US 5,885,192, 03/1999, Karrison et al. (withdrawn)

\* cited by examiner

METHOD AND APPARATUS FOR SMART BEAM SELECTION IN A SMART ANTENNA SYSTEM

CROSS-REFERENCE TO RELATED APPLICATIONS

The present application is a continuation of U.S. patent application Ser. No. 11/514,282, filed on Aug. 30, 2006 and entitled "Method and Apparatus for Beam Selection in a Smart Antenna System" by Omri Hovers et al., which is a continuation of U.S. patent application Ser. No. 10/124,541 filed Apr. 16, 2002, now U.S. Pat. No. 7,289,826, all of which are incorporated herein by reference, and are assigned to the assignee of claimed and/or disclosed subject matter.

TECHNICAL FIELD OF THE INVENTION

This invention relates generally to the field of wireless communications systems and, more specifically, to a method and apparatus for beam selection in a smart antenna add-on or applique.

BACKGROUND OF THE INVENTION

The rising use of mobile communications systems has led to an increasing demand for enhancing efficiency and performance characteristics, such as increasing network capacity, data rate, signal quality, network coverage, and power efficiency. When a wireless signal is transmitted to a receiver, such as an antenna, the receiver often receives interference along with the signal, making it difficult for the receiver to determine the original signal. This interference may include interference caused by the multipath phenomenon and/or co-channel interference caused by other signals or random noise in the same frequency as the original signal. Smart antenna (SA) systems are designed to reduce these types of interferences, and thus enhance the performance characteristics discussed above.

A smart antenna system is generally located near a base station transceiver and combines an array of antenna elements with digital signal processing capabilities to receive and transmit signals in a spatially sensitive manner. In other words, a smart antenna can adapt the direction of transmissions in response to the signals it receives. Thus, a smart antenna system may be said to track, or follow, mobile communication devices (such as mobile phones or personal digital assistants) as they change their location or active status (such as idle, ready, or standby). For example, when a mobile user is located in a particular location within a sector, the smart antenna system may select a best beam that provides the best coverage for that location and transmit signals to and receive signals from the mobile through that best beam. As the user moves to new locations, the smart antenna system may adapt by switching to the beam or beams that provide the best coverage for those locations.

SUMMARY OF THE INVENTION

In accordance with the present invention, a method and apparatus for beam selection in a smart antenna system are provided that substantially eliminate or reduce the disadvantages and problems associated with previously developed methods and apparatuses.

In one embodiment of the present invention, a method of beam selection in a smart antenna system is provided. The method includes receiving a plurality of uplink beams by a plurality of receivers, each corresponding with one of the plurality of uplink beams. Each uplink beam includes signals transmitted by a mobile station. The method further includes analyzing each of the plurality of uplink beams and selecting an uplink beam from the plurality of uplink beams based at least in part on the analysis of the uplink beams. The method further includes switching to the selected beam in real time to allow the signals communicated in the selected beam to be communicated to a base station transceiver.

In another embodiment, another method of beam selection in a smart antenna system is provided. The method includes receiving signals from a mobile station via a plurality of beams. The signals received via each beam include a signal sequence. The method further includes correlating the signal sequence received via each beam with one or more known training sequences to determine a correlation quality of each beam. The method further includes selecting one or more of the plurality of beams for communication between the mobile station and a base station transceiver based at least in part on one or more parameters including the correlation quality of each of the plurality of beams.

In another embodiment, yet another method of beam selection in a smart antenna system is provided. The method includes receiving signals from a mobile station via a plurality of beams. The method further includes executing a first algorithm to select a first beam from the plurality of beams based at least in part on a first parameter, and executing a second algorithm to select a second beam from the plurality of beams based at least in part on a second parameter. The method further includes determining whether to communicate the first beam or the second beam to a base station transceiver based on one or more selection criteria.

Various embodiments of the present invention may benefit from numerous technical advantages. It should be noted that one or more embodiments may benefit from all, some, or none of the advantages discussed below.

One technical advantage includes a smart antenna apparatus operable to reduce the interference, such as multi-path and co-channel interference, associated with uplink signals received by a new or existing base station transceiver. In addition, the smart antenna apparatus may reduce the interference associated with downlink signals received by mobile stations. Thus, the smart antenna apparatus may increase the effective capacity and improve the overall performance of the base station transceiver without requiring any modifications to the base station transceiver. For example, since using narrow beams generally increases the range (or coverage) of effective reception and transmission as compared with wide beams, the smart antenna apparatus may increase the range of the base station transceiver to which it is added. Moreover, the smart antenna apparatus may improve the signal-to-noise ratio (SNR) of transmitted and/or received signals, and thus increases the data rate which may be transmitted and/or received by the base station transceiver.

Another technical advantage includes a smart antenna apparatus operable to determine beam selections based at least in part on a quality factor determined for each of a plurality of uplink beams. The quality factor for each beam may be determined based on one or more parameters, such as a correlation quality of each beam. The correlation quality of each beam is an accurate measurement of the quality of each uplink beam and may also provide an accurate indication of whether an uplink beam comprises a signal from a mobile station or noise from some other source.

Yet another technical advantage includes a smart antenna apparatus operable to select a best beam for uplink communications and a best beam for downlink communications that may be different from the selected best beam for uplink communications, depending on the circumstances. This provides an advantage because the best beam for communicating uplink signals from a mobile station may not always be the best beam for communicating downlink signals to that mobile station.

Still another technical advantage includes a smart antenna apparatus operable to select a best beam in real time. In other words, the smart antenna apparatus is operable to select a beam based on uplink signals received in a particular time slot and switch to that beam during the same time slot. Thus, the smart antenna apparatus is operable to select a best beam when receiving an initial communication from a mobile station, such as a random access channel (RACH) burst. This increases the effective range of a base station transceiver for identifying initial signals from a mobile station.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF THE DRAWINGS

Figure 1:
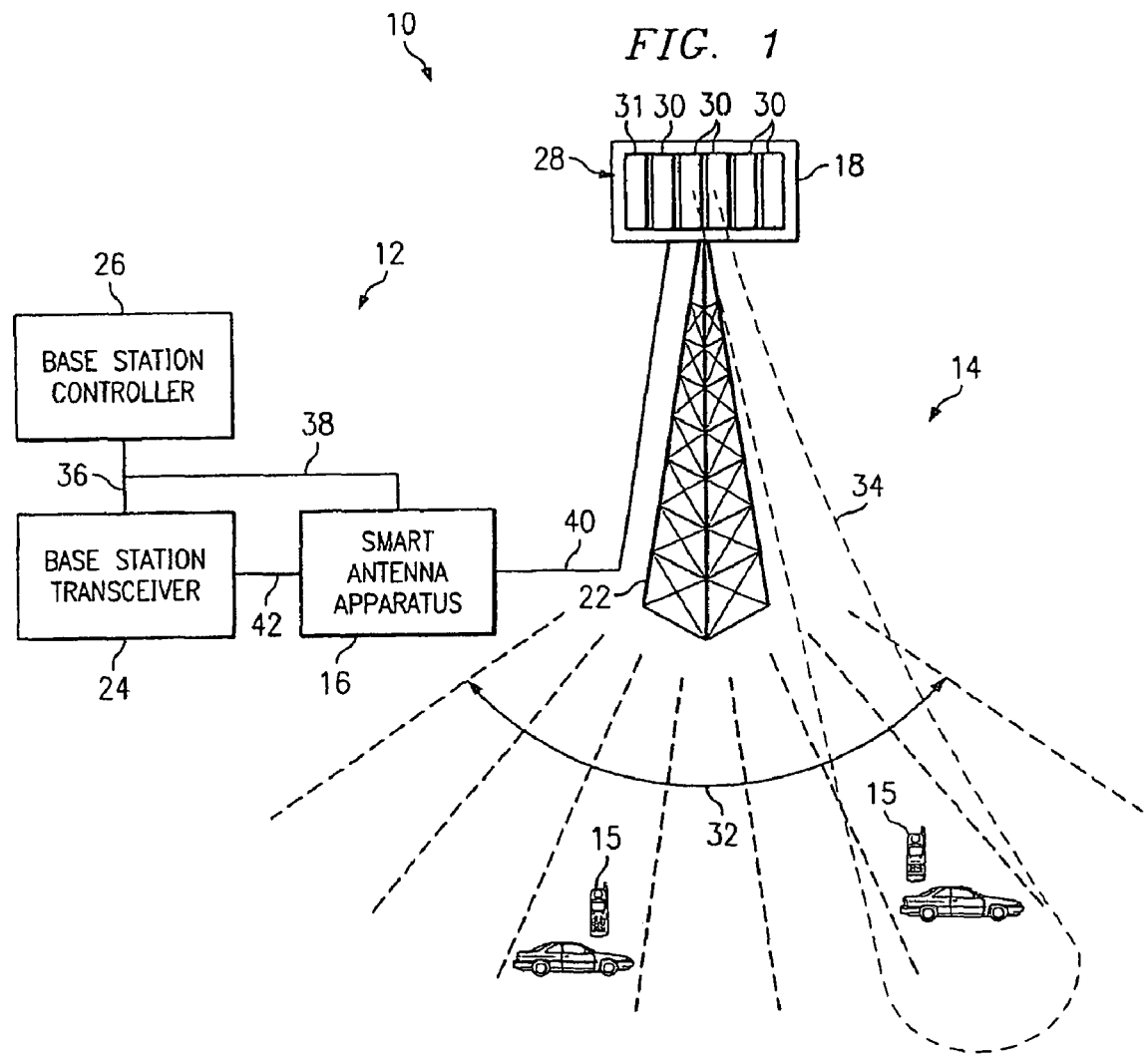
FIG. 1 illustrates a wireless communication system including a smart antenna system and a base station in accordance with an embodiment of the present invention.

Example embodiments of the present invention and their advantages are best understood by referring now to FIGS. 1 through 23 of the drawings, in which like numerals refer to like parts.

Generally, a smart antenna system is provided as an add-on to an existing base station in a wireless communications system. The smart antenna system combines an antenna unit that may include a smart antenna array and optionally a backup sector antenna with a smart antenna apparatus having signal processing capabilities to receive and transmit signals in a spatially sensitive manner, or in other words, along one or more selected beams. The smart antenna apparatus is operable to execute one or more algorithms, based on a number of inputs, to select an uplink beam for uplink signals and a downlink beam for downlink signals. The uplink beam is used to communicate uplink signals received from a mobile station to a base station transceiver. The downlink beam is used to communicate downlink signals from the base station transceiver to the mobile station.

The smart antenna apparatus may include a fast decision beam selection module to make beam selections in substantially real time and a smart decision beam selection module to make beam selections based on more input and processing.

The smart antenna apparatus may be operable to determine whether to use the results from the fast decision beam selection module or the smart decision beam selection module depending on the particular circumstances. In general, the smart antenna apparatus may use the fast decision beam selection module to make beam selections during the initiation of a call from a mobile station and then switch to the smart beam selection module after the call is established.

The smart antenna system may collect and use signaling information for making beam selection determinations generally as follows. The base station transceiver and the base station controller communicate signaling and traffic information with each other via an interface, such as an A-bis interface in a GSM or GPRS environment or an LUB interface in a 3G environment. The smart antenna apparatus includes a monitoring system coupled to the signaling interface and operable to receive signaling information being communicated between the base station transceiver and the base station controller without affecting, or disturbing, the communication of the signaling or traffic information between base station transceiver and the base station controller. The signaling information received by the monitoring system may then be decoded, filtered and/or otherwise processed to determine relevant signaling information for the smart antenna apparatus. The relevant signaling information may be used by a smart antenna processing system in selecting uplink and/or downlink beams.

In addition, the smart antenna apparatus may also be operable to synchronize itself with the base station transceiver in time and frequency using control channel signals being communicated from the base station transceiver to one or more mobile stations. The smart antenna apparatus may include a control channel monitoring module operable to convert control channel signals received from the base station transceiver in a downlink frequency to a frequency that may be received by a smart antenna receiver. A processing module may execute one or more synchronization algorithms using the control channel signals as input in order to synchronize the smart antenna apparatus with the base station system in time and frequency.

The smart antenna apparatus may be coupled to the existing base station as an applique with little or no modification needed to be made to any component of the base station, including the base station transceiver. In particular, the signaling information monitoring system is operable to passively monitor the signaling information being communicated between the base station controller and the base station transceiver without making any modifications to the base station controller or the base station transceiver. In addition, the control channel monitoring module is operable to passively monitor the control channel information being communicated from the base station transceiver to the mobile stations without making any modifications to the base station transceiver. Thus, the smart antenna apparatus may be easily and inexpensively coupled to a variety of existing base stations.

FIG. 1 illustrates an embodiment of a wireless communication system 10 that includes a base station system 12, a smart antenna system 14, and one or more mobile stations 15. In one embodiment, wireless communication system 10 operates in a GSM (Global System for Mobile Communications) environment. However, wireless communication system 10 may operate according to other wireless standards including, for example, CDMA (Code Division Multiple Access) standards such as IS-95A and IS-95B, CDMA 2000, W-CDMA, TD SCDMA, TETRA, and TDMA (Time Division Multiple Access) standards such as IS-136 and IS-54, without departing from the scope of the present invention.

Base station system 12 may include one or more base station transceivers 24, a base station controller 26, and any other suitable components of a wireless communications base station. Smart antenna system 14 may include an antenna unit 18 and a smart antenna apparatus 16. Smart antenna apparatus 16 may be coupled to base station system 12 as an add-on or an applique.

Base station transceiver 24 is generally operable to communicate radio signals to and from antenna unit 18 via one or more radio signal wires 40 and 42. In this manner, base station transceiver 24 is operable to transmit radio signals to and receive radio signals from one or more mobile stations 15 via antenna unit 18. Base station controller 26 is generally operable to control the operation of one or more base station transceivers 24.

Base station controller 26 and base station transceiver 24 may be coupled by an interface 36. Interface 36 may be operable to communicate signals, including traffic and control (or signaling) information, between base station controller 26 and base station transceiver 24, as described in greater detail with reference to FIG. 9.

In a GSM (Global System for Mobile Communications) environment, base station system 12 may be a Base Station System (BSS), base station transceiver 24 may be a Base Transceiver Station (BTS) and base station controller 26 may be a Base Station Controller (BSC). In a third-generation (3G) environment (such as W-CDMA or CDMA 2000, for example), base station system 12 may be a Radio Network Server ENS), base station transceiver 24 may be a Node B base station, and base station controller 26 may be a Radio Network Controller (RNC). Base station system 12, base station transceiver 24, and base station controller 26 may alternatively be any other suitable base station components in other wireless communication environments or under different communication standards.

Antenna unit 18 may include a smart antenna array 28 including a plurality of antenna elements 30. Antenna unit 18 may also include a sector antenna 31 operable to transmit and/or receive signals throughout a sector. In some embodiments, sector antenna 31 is comprised of one or more antenna elements similar to antenna elements 30 in smart antenna array 28. In the embodiment shown in FIG. 1, antenna unit 18 is located on an antenna tower 22. However, antenna unit 18 may be otherwise located, for example on a building. Preferably, signals directed to and from antenna unit 18 are generally unobstructed near antenna unit 18, or in other words, antenna elements 30 can "see" a large area.

Traditional sector antennas used in cellular communication systems transmit radio signals in a wide beam to a relatively wide area, or sector, since the location of mobile stations is unknown to the system. Such systems pollute the electromagnetic environment by transmitting signals in unnecessary directions. In contrast, smart antenna system 14 divides the wide beam into a plurality of narrow beams. For example, in the embodiment shown in FIG. 1, smart antenna system 14 divides a wide beam 32 covering an approximate 120 degree range into seven narrow beams 34. This is accomplished by manipulating the phase of the signals received by antenna elements 30 of smart antenna array 28. In some embodiments, narrow beams 34 are formed using a beamforming network, sometimes referred to as a BFN. In contrast, sector antenna 31 transmits and receives signals throughout the sector through wide beam 32, bypassing the beamforming network. Signals may be communicated between antenna unit 18 and a particular mobile station 15 via a narrow beam 34 or via wide beam 32 (using sector antenna 31), depending on various parameters.

Antenna unit 18 may be coupled to smart antenna apparatus 16 by one or more radio signal wires 40 operable to communicate radio signals between antenna unit 18 and smart antenna apparatus 16. For example, antenna unit 18 may be coupled to smart antenna apparatus 16 by a plurality of radio signal wires 40, each corresponding to a narrow beam 34. Similarly, smart antenna apparatus 16 may be coupled to base station transceiver 24 by one or more radio signal wires 42 operable to communicate radio signals between smart antenna apparatus 16 and base station transceiver 24. Radio signal wires 40 and 42 may include any wire media suitable for communicating radio frequency signals. For example, in one embodiment, radio signal wires 40 and 42 are radio frequency (RF) cables.

When a mobile station 15 transmits uplink signals, the uplink signals may be received along any number of narrow beams 34 due to multi-path or other interference phenomena, and/or due to overlapping areas covered by adjacent narrow beams 34. The uplink signals received via each narrow beam 34 are communicated to smart antenna apparatus 16 via radio signal wires 40. In one embodiment, one or more separate radio signal wires 40 are provided to communicate the signals received via each narrow beam 34.

Smart antenna apparatus 16 processes uplink signals received along each narrow beam 34 and/or other input signals or data to select the best narrow beam 34 and to allow uplink signals received via that narrow beam 34 to be communicated to base station transceiver 24 via radio signal wires 42. For example, smart antenna apparatus 16 may select the best narrow beam 34 based on one or more inputs or parameters. One input may include signaling information received by signaling information monitoring system 106 (described below in connection with FIG. 2). Other example inputs or parameters include signal strength, signal quality, relevant power, and signal history of signals received from one or more mobile stations 15. After smart antenna apparatus 16 communicates the uplink signals received via the selected narrow beam 34 to base station transceiver 24, the uplink signals may be processed and/or further communicated by base station system 12. It should be noted that the term "narrow beam" as used in this document applies both to the physical beams through which antenna unit 18 transmits and receives signals (as indicated using reference numeral 34 in FIG. 1) as well as the signals received via each of the physical beams.

When downlink signals are to be transmitted from base station system 12 to mobile station 15, the downlink signals are communicated from base station transceiver 24 to smart antenna apparatus 16 via radio signal wires 42. Smart antenna apparatus 16 may select a best narrow beam 34 through which to send the downlink signals. Like the beam selection for uplink signals discussed above, the beam selection for the downlink signals may be based on one or more inputs or parameters, including signaling information received by signaling information monitoring system 106. Other example inputs or parameters include signal strength, signal quality, and signal history of signals received from one or more mobile stations 15.

Smart antenna apparatus 16 may switch from one narrow beam 34 to another narrow beam 34 accordingly. For example, when mobile station 15 moves to a new location, smart antenna system 14 may switch from one narrow beam 34 to another narrow beam 34 for receiving uplink signals from and/or transmitting downlink signals to mobile station 15. In this manner, smart antenna system 14 may locate and track mobile stations 15 as they move within wide beam 32, and transmit signals to and receive signals from each mobile stations 15 via one or more appropriate narrow beams 34. At a particular point in time, the narrow beam 34 selected as the best beam for communicating uplink signals received from mobile station 15 to base station transceiver 24 may be the same as, or different from, the narrow beam 34 selected as the best beam for communicating downlink signals to mobile station 15. This may provide an advantage in situations in which the best beam for receiving uplink signals from a mobile station is not the same as the best beam for transmitting signals to that mobile station. This may be likely, for example, in high-interference environments, such as dense or urban environments.

Base station system 12 may communicate with mobile stations 15 within a range of frequencies, which may be divided into a number of frequency bands. According to some wireless communication standards, the available bandwidth is divided into a number of frequency bands, which may each be referred to simply as a frequency. In some standards, each uplink frequency (in other words, a frequency used for uplink communications) may be associated with a corresponding downlink frequency, such that pairs of frequencies are available. For example, in a P/E/R-GSM 900 environment, each frequency (both uplink and downlink) has a bandwidth of 200 kHz, and each uplink frequency band is offset from its corresponding downlink frequency band by 45 MHz. Typically, due to limitations of signal interference and cost, only a portion of the frequencies available in a particular environment are used by any particular base station transceiver. For example, in one embodiment, four pairs of uplink and downlink frequencies are to be used by each base station transceiver. It should be noted that in other standards, such as the TD-SCDMA standard, one frequency is used for both uplink and downlink communications.

In a GSM environment, signals may be communicated in different frequencies over a period of time, which is divided into frames that are each divided into eight time slots, or channels. Each time slot, or channel, is either a control channel or a traffic channel. Control channels are operable to carry control signals and/or signaling or paging signals, while traffic channels are operable to carry voice and/or other data signals. In the GSM standard, one of the eight channels in a particular frequency, which may be referred to hereinafter as the control frequency, is designated as the control channel. The remaining channels in the control frequency may be traffic channels operable to carry conversations. The control frequency thus consists of one control channel and seven traffic channels. Each remaining frequency may be referred to as a traffic frequency consisting of eight traffic channels. Generally, each traffic channel can support one conversation or other communication in full rate, two conversations or other communications in half rate, or an unlimited number of conversations or other communications in GPRS or group mode.

When a particular mobile station 15 is engaged in a call, voice and/or other data signals intended for that mobile station 15 are transmitted from base station system 12 via smart antenna array 28 within a particular traffic channel (or time slot) in a particular frequency. The mobile station 15 will "listen" for the voice and/or data signals only in the particular traffic channel in the particular frequency. Thus, mobile station 15 must know when, and at which frequency, to "listen" for the voice signals, and thus must be synchronized to base station transceiver 24.

Smart antenna apparatus 16 must also be synchronized with base station transceiver 24 in order to operate properly.

For example, smart antenna apparatus 16 must be synchronized with base station transceiver 24 in order to perform its beam-switching functions as discussed above. Further, in some embodiments, smart antenna apparatus 16 should be synchronized with base station 12 more accurately than mobile station 15 is synchronized with base station 12. The synchronization of smart antenna apparatus 16 with base station 12 is discussed in greater detail below with reference to FIGS. 5 through 8.

Figure 2:
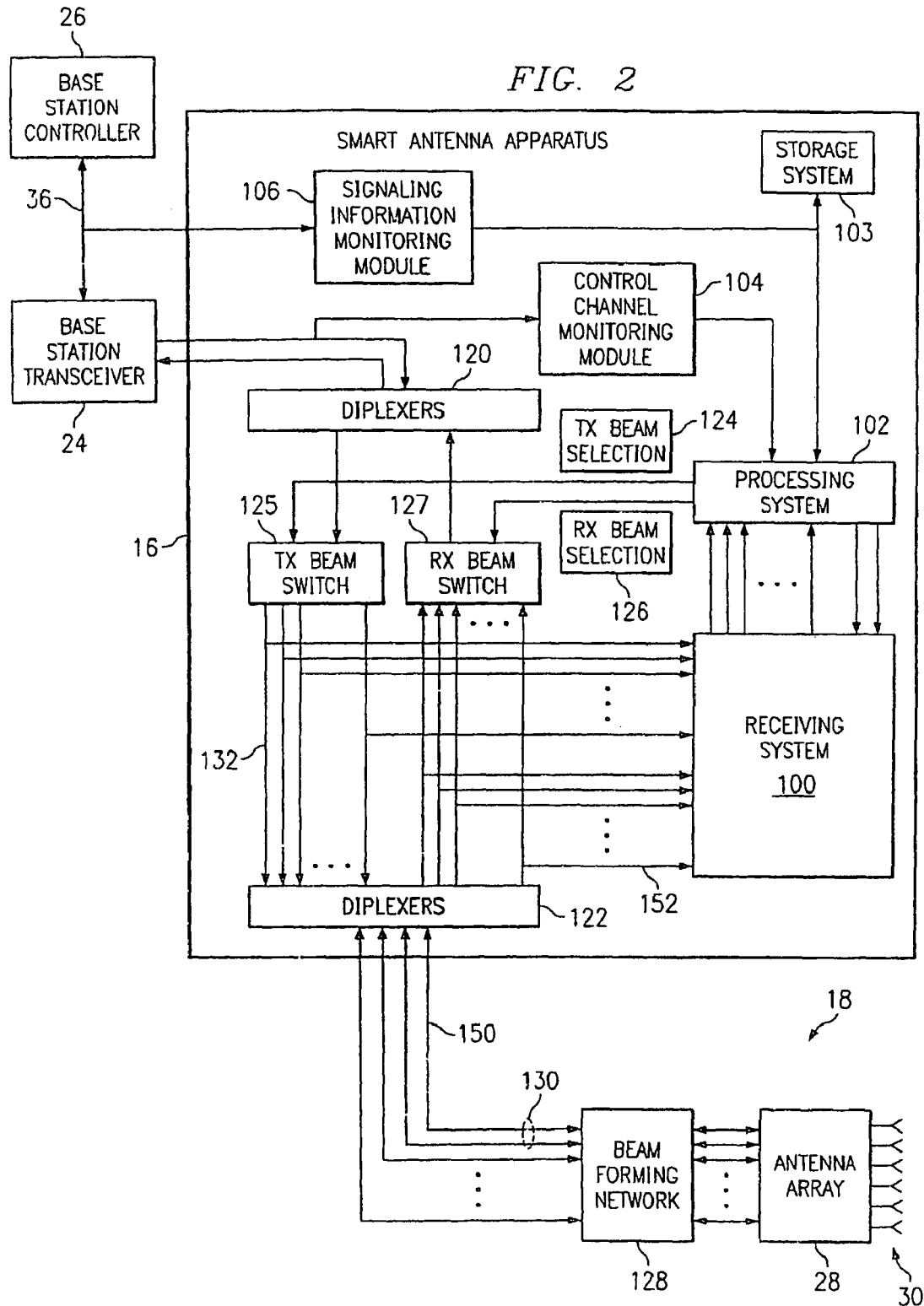
FIG. 2 illustrates the general architecture and operation of the smart antenna system of FIG. 1 including a smart antenna apparatus and an antenna unit.

FIG. 2 illustrates the general architecture and operation of smart antenna system 14. As discussed above, smart antenna system 14 includes smart antenna apparatus 16 and antenna unit 18. Smart antenna apparatus 16 includes a receiving system 100, a processing system 102, a storage system 103, a control channel monitoring module 104, and a signaling information monitoring system 106. In some embodiments, smart antenna apparatus 16 also includes one or more diplexers, such as diplexers 120 and 122.

Receiving system 100 is generally operable to receive radio signals communicated from mobile stations 15. In particular, receiving system 100 may receive analog radio signals communicated from mobile stations 15, received at antenna unit 18, and communicated to receiving system 100 via paths 150 and 152. Receiving system 100 may be further operable to convert the analog radio signals to digital signals and communicate the digital signals to processing system 102.

Figure 3:
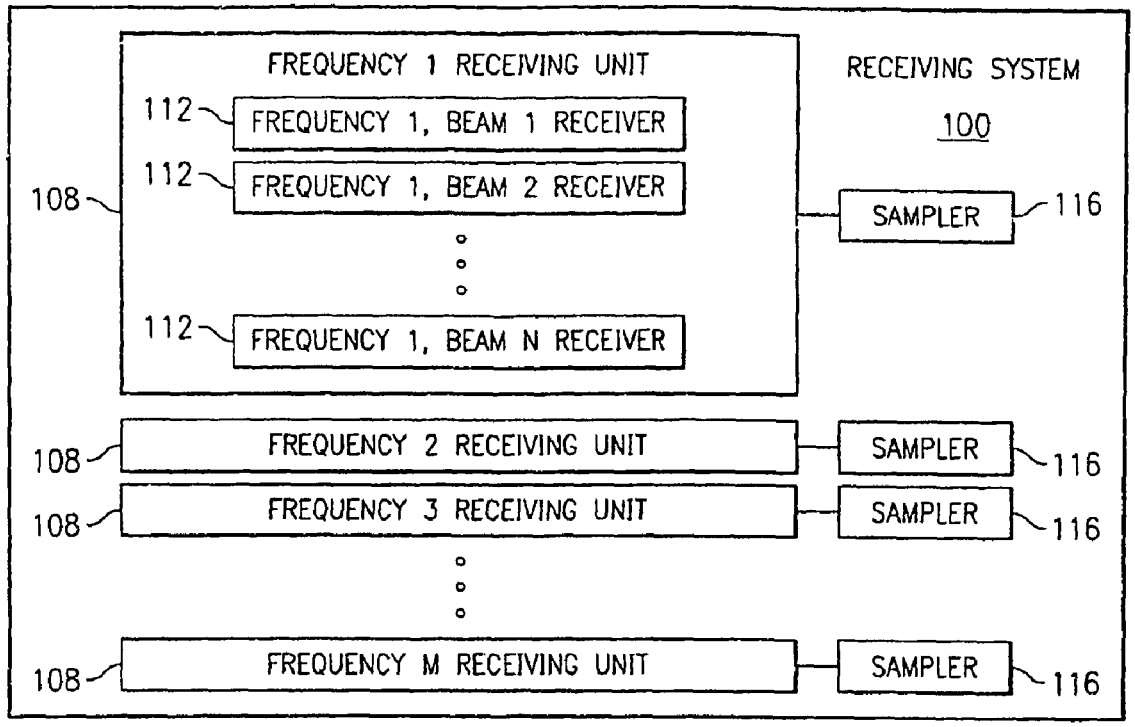
FIG. 3 illustrates a receiving system of the smart antenna apparatus of FIG. 2.

As shown in FIG. 3, receiving system 100 may include one or more frequency receiver units 108, each corresponding with a particular frequency (in other words, a frequency band) and thus operable to receive signals communicated by mobile stations 15 via that frequency. Each frequency receiver unit 108 may include one or more beam receivers 112 operable to receive signals communicated in a particular frequency. Each frequency receiver unit 108 may include a beam receiver 112 corresponding with each narrow beam 34. For example, in one embodiment in which smart antenna system 14 divides wide beam 32 into seven narrow beams 34, each frequency receiver unit 108 includes eight beam receivers 112, one for each of the seven narrow beams 34 and one for wide beam 32, which is received by sector antenna 31. Beam receivers 112 may be operable to convert received radio frequency signals into baseband signals. In a particular embodiment, the beam receivers 112 are identical to each other.

Receiving system 100 may also include one or more samplers 116 operable to convert signals from analog to digital. In particular, one or more samplers 116 may convert analog signals received by each beam receiver 112 to digital signals such that the signals may be processed by processing system 102.

Referring again to FIG. 2, processing system 102 is generally operable to perform beam-selection functions. In particular, processing system 102 may execute one or more algorithms based on various inputs and/or parameters to determine a transmitting beam selection 124 and a receiving beam selection 126. In other words, processing system 102 is operable to select one of the narrow beams 34 to communicate signals received by antenna unit 18 to base station transceiver 24, and one of the narrow beams 34 (which may be the same or a different narrow beam 34) to transmit downlink signals to mobile stations 15.

Figure 4:
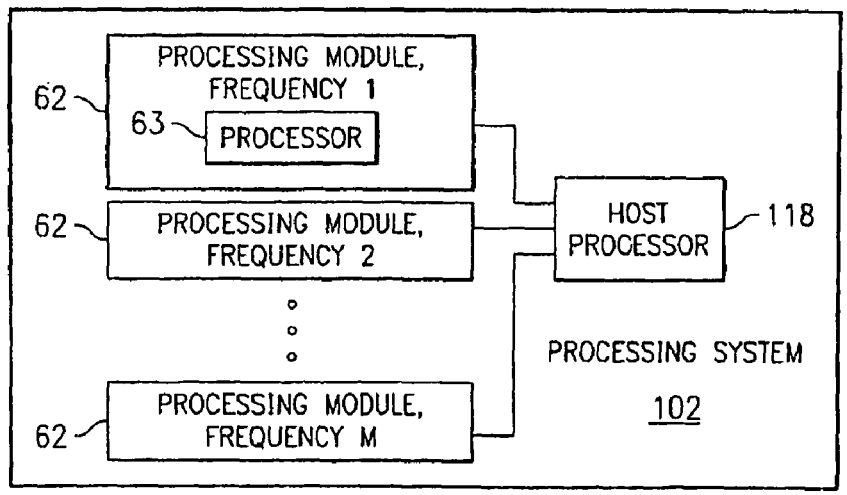
FIG. 4 illustrates a processing system of the smart antenna apparatus of FIG. 2.

As shown in FIG. 4, processing system 102 may include one or more processing modules 62 operable to process received signals, such as signaling signals, control signals, and/or traffic signals. In some embodiments, processing system 102 includes one processing module 62 for each frequency used by smart antenna system 14. Thus, each processing module 62 may process signals communicated in one of the frequencies used by base station transceiver 24. Each processing module 62 is generally operable to perform one or more functions, including beam-selection functions. In an environment using time division multiplexing, such as a GSM environment, each processing module 62 may be operable to determine both uplink and downlink beam selections for communicating signals in each time slot. Thus, in some embodiments, each processing module 62 is operable to determine both uplink and downlink beam selections for each time slot in a particular frequency.

Processing modules 62 may make beam selection decisions based on one or more inputs or parameters, including signals received from receiving system 100 and/or signaling information received from signaling information monitoring system 106. For example, each processing module 62 may be operable to execute one or more beam-selection algorithms to make beam selection determinations. In one embodiment, each processing module 62 is operable to execute a fast decision beam-selection algorithm or a smart decision beam-selection algorithm based on one or more parameters, such as whether the processor has knowledge of the number and/or location of mobile stations 15 using the frequency corresponding with that processing module 62.

One or more processing modules 62 may also be operable to synchronize smart antenna apparatus 16 with base station transceiver 24 in time and/or frequency. In particular, one or more processing modules 62 may be operable to execute one or more synchronization algorithms using control signals, including synchronization signals, received from control channel monitoring module 104 to synchronize smart antenna apparatus 16 with base station transceiver 24.

Processing system 102 may also include a central processing unit, such as host processor 118, operable to further process the output of each processing module 62. In one embodiment, host processor 118 is operable to determine errors or whether the outputs of one or more processing module 62 are valid or require modification.

Each processing module 62 may include one or more processors 63, such as microprocessors, digital signal processors, or any other type of processors capable of executing an algorithm. In one embodiment, each processing module 62 includes one or more programmable digital signal processors. Although processing system 102 as described above includes discrete processing modules 62 for processing signals at different frequencies or for performing different functions, it should be understood that the processing functions performed by smart antenna system 14 may be performed by any appropriate number and combination of processing modules 62.

Referring again to FIG. 2, storage system 103 is operable to store information or data for use by smart antenna apparatus 16. In particular, storage system 103 may store information received from signaling information monitoring system 106. Storage system 103 may also be operable to provide information to and receive information from processing system 102.

Control channel monitoring module 104 is generally operable to receive control channel signals, including synchronization signals, being communicated from base station transceiver 24 to antenna unit 18, and to prepare such signals to be processed by processing system 102. In some embodiments, control channel monitoring module 104 is operable to filter and convert the control channel signals from a base station transmitting frequency to a smart antenna receiving frequency, receive and sample the signals, and communicate the signals to processing system 102. The control channel signals, including the synchronization signals, may then be processed by processing system 102 in order to synchronize smart antenna apparatus 16 with base station transceiver 24, as discussed in greater detail below with reference to FIGS. 5 through 8.

Signaling information monitoring system 106 is generally operable to monitor, or receive, signaling information (in other words, base station control information) being communicated between base station transceiver 24 and base station controller 26 via interface 36. Signaling information monitoring system 106 may also be operable to extract a subset of relevant information from the received signaling information to communicate to processing system 102 as an input in making beam-selection determinations. The relevant information may include information related to one or more mobile stations 15, such as frequency hopping, for example. The systems and methods for monitoring the signaling information are discussed in greater detail below with reference to FIGS. 9 and 10.

The various systems and modules of smart antenna apparatus 16, including receiving system 100, processing system 102, control channel monitoring module 104, and signaling information monitoring system 106, as well as the components of each system and module; may or may not be co-located, and may be divided and/or combined in any appropriate manner. For example, smart antenna apparatus 16 may include a ground unit located on or near the ground and a tower unit coupled to antenna tower 22. In one embodiment, smart antenna apparatus 16 includes a ground unit located on the ground and a tower unit located near the top of antenna tower 22 proximate antenna unit 18. In another embodiment, smart antenna apparatus 16 includes a ground unit and a tower unit both located on or near the ground. In another embodiment, smart antenna apparatus 16 includes only one unit such that the components of smart antenna apparatus 16 are generally co-located.

As shown in FIG. 2, antenna unit 18 may include antenna array 28 comprising antenna elements 30, as well as a beam forming network (BFN) 128. Beam forming network 128 is operable to form a plurality of uplink beams 130, each corresponding with, and communicating signals received via, one of the narrow beams 34 by controlling the amplitude and phase of signals received by antenna elements 30. In one embodiment, beam forming network 128 forms seven uplink beams 130.

In operation, uplink analog signals are communicated by one or more mobile stations 16 via one or more narrow beams 34 and received by antenna array 28. Beam forming network 128 forms a plurality of uplink beams 130 and communicates uplink beams 130 to smart antenna apparatus 16. Uplink beams 130 are received by receiving system 100. In one embodiment in which smart antenna apparatus 16 includes diplexer 122, uplink beams 130 are received by receiver system 100 after passing through diplexer 122. Each uplink beam 130 may be received by a separate frequency receiver unit 108. Each beam may then be converted from analog to digital by a sampler 116.

The digital uplink beams 130 are then communicated to processing system 102. Using the received uplink beams 130, signaling information received from signaling information monitoring system 106, and/or other parameters as input, processing system 102 executes one or more beam-selection algorithms to determine a receiving beam selection 126 corresponding to one of the uplink beams 130. The receiving beam selection 126 is communicated to a receiving beam switch 127 which filters the uplink beams 130 received from beam forming network 128 such that only the uplink beam 130 corresponding to the receiving beam selection 126 may pass through to base station transceiver 24. In one embodiment in which smart antenna apparatus 16 includes diplexer 120, the uplink beam 130 is received by base station transceiver 24 after passing through diplexer 120.

In particular, each processing module 62 may execute one or more beam-selection algorithms to determine a receiving beam selection 126 for each frequency used by smart antenna system 14. In addition, in a time division multiplexing environment, such as a GSM environment, each processing module 62 may determine a receiving beam selection 126 for each time slot in each frequency.

In one embodiment, each processing module 62 determines a receiving beam selection 126 by determining a fast decision beam selection using a fast decision beam selection module and/or a smart decision beam selection using a smart decision beam selection module. The processing module 62 may determine whether to use the fast decision beam selection or the smart decision beam selection as the receiving beam selection 126 based on one or more parameters, such as whether the processor has prior knowledge of a particular mobile stations 15.

In some embodiments, the fast decision beam selection module is operable to determine the receiving beam selection 126 in real time. In other words, the fast decision beam selection module is operable to determine a fast decision beam selection based on signals communicated via each uplink beam 130 in a first portion of a particular time slot, and receiving beam switch 127 is operable to switch to the fast beam selection in real time such that signals communicated via the selected uplink beam 130 in a subsequent portion of the same time slot may pass through receiving beam switch 127 to base station transceiver 24.

In contrast, the smart decision beam selection module may determine the receiving beam selection 126 to be used by receiving beam switch 127 in later time slots or frames. For example, in one embodiment, the smart decision beam selection module determines a smart decision beam selection based on the signals received in the current time slot and one or more previous time slots, but receiving beam switch 127 does not switch to the smart decision beam selection until the following frame. Thus, in this embodiment, receiving beam switch 127 may switch to the uplink beam 130 corresponding with the smart decision beam selection in the frame following the last frame used in determining the smart decision beam selection.

Downlink signals are communicated from base station transceiver 24 to be transmitted to one or more mobile stations 15 via antenna unit 18. The downlink signals are received by smart antenna apparatus 16 and a downlink beam 132 corresponding with one of the narrow beams 34 is selected for communicating the downlink signals to the mobile stations 15. In one embodiment in which smart antenna apparatus 16 includes diplexer 120, the downlink signals pass through diplexer 120 before being assigned to a narrow beam 34.

A transmitting beam switch 125 is operable to assign the downlink signals to a downlink beam 132 based on a transmitting beam selection 124 determined by processing system 102. The same or similar inputs and/or parameters used to determine receiving beam selection 126 may be used by processing system 102 to determine transmitting beam selection 124. The downlink signals are assigned to the downlink beam 132 corresponding to the transmitting beam selection 124 and the downlink beam 132 is communicated to antenna unit 18 and transmitted through the corresponding narrow beam 34. In one embodiment in which smart antenna apparatus 16 includes diplexer 122, the downlink beam 132 is received by antenna unit 18 after passing through diplexer 122.

As with the uplink beam selection, each processing module 62 may execute one or more beam-selection algorithms to output a transmitting beam selection 124 for each frequency used by smart antenna system 14. In addition, in a time division multiplexing environment, such as a GSM environment, each processing module 62 may determine a transmitting beam selection 124 for each time slot in each frequency. At any particular time, the transmitting beam selection 124 for a particular downlink channel may or may not be the same as the receiving beam selection 126 determined for the corresponding uplink channel. In other words, the narrow beam 34 corresponding with the uplink beam 130 selected for communicating uplink signals from a mobile station 15 to base station transceiver 24 may not always be the same narrow beam 34 selected for communicating downlink signals from base station transceiver 24 to that mobile station 15. In addition, as with the receiving beam selection, each processing module 62 may determine a transmitting beam selection 124 by determining a fast decision beam selection using a fast decision beam selection module and/or a smart decision beam selection using a smart decision beam selection module.

As discussed above, the inputs used by processing system 102 in making beam selection determinations may include signaling information received from signaling information monitoring system 106. In operation, signaling information monitoring system 106 monitors, or receives, signaling information being communicated between base station transceiver 24 and base station controller 26 via interface 36. Signaling information monitoring system 106 extracts relevant information from the received signaling information and communicates this information to processing system 102 as an input for making beam selections. The systems and methods for monitoring the signaling information are discussed in greater detail below with reference to FIGS. 9 and 10.

Processing system 102 is synchronized and kept in synchronization with base station transceiver 24 using control signals received from control channel monitoring module 104. In operation, control channel monitoring module 104 receives, or monitors, control channel signals (including synchronization signals) being communicated from base station transceiver 24 to antenna unit 18. Control channel monitoring module 104 filters and converts the control channel signals from a base station transmission frequency to an smart antenna receiving frequency, receives and samples the signals, and communicate the signals to processing system 102. Processing system 102 uses the signals to synchronize itself with base station transceiver 24 in time and frequency. Processing system 102 may execute one or more synchronization algorithms using the control channel signals as input to synchronize itself with base station transceiver 24. The system and method of synchronization is discussed in detail below with reference to FIGS. 5 through 8.

FIGS. 5 through 8 illustrate example systems and methods for accurately synchronizing smart antenna apparatus 16 with base station transceiver 24 in time and frequency. In general, smart antenna apparatus 16 uses the same synchronization signals that are used by mobile station 15 to synchronize mobile station 15 with base station transceiver 24. In one embodiment, the synchronization signals are obtained by smart antenna apparatus 16 from the radio signals being communicated from base station transceiver 24 to antenna unit 18 via radio signal wires 42 and 40. The path of the radio signals transmitted from base station transceiver 24 may be split at smart antenna apparatus 16 such that one path is used to synchronize smart antenna apparatus 16 with base station transceiver 24 and another path continues to, and is transmitted by, antenna unit 18 in order to synchronize mobile stations 15 with base station transceiver 24.

In this manner, smart antenna apparatus 16 may be synchronized accurately with base station transceiver 24 using the radio signals communicated from base station transceiver 24 via radio signal wires 40. Thus, in some embodiments, the components of base station system 12, including base station transceiver 24, do not need to be modified, altered, or reconfigured in order for smart antenna apparatus 16 to be synchronized with, and maintained in synchronization with, base station transceiver 24. In one embodiment, smart antenna apparatus 16 may be synchronized accurately with base station transceiver 24 using only signals received from base station transceiver 24 via radio signal wires 42. Thus, the cost and labor of modifying or altering base station system 12 and/or dealing or negotiating with the manufacturer of the components of base station system 12, such as base station transceiver 24, is reduced or, in some embodiments, eliminated.

In addition, smart antenna apparatus 16 may be synchronized accurately with base station transceiver 24 without interfering with the radio signals being communicated from base station transceiver 24 and intended for mobile stations 15. This is accomplished by splitting the path of the radio signals communicated from base station transceiver 24 into a first path directed toward antenna unit 18 for synchronizing mobile stations 15 and a second path directed toward a smart antenna receiver and processor for synchronizing smart antenna apparatus 16, as discussed below in greater detail.

Figure 5:
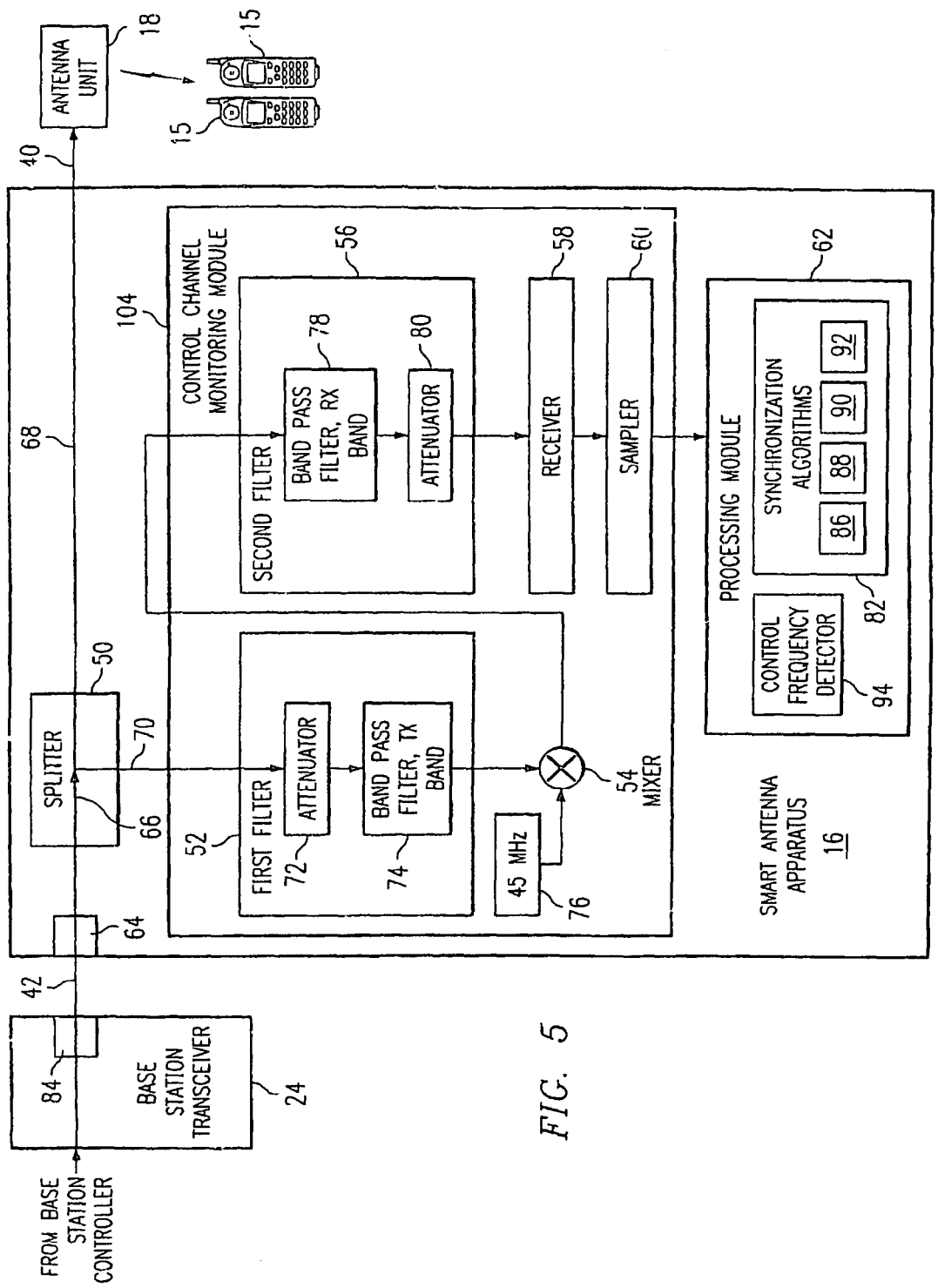
FIG. 5 illustrates a system for monitoring control signals being communicated from a base station transceiver to mobile stations and synchronizing the smart antenna apparatus with the base station transceiver using the control signals in accordance with an embodiment of the present invention.

FIG. 5 illustrates an embodiment of a base station transceiver 24, a smart antenna apparatus 16, and an antenna unit 18 for synchronizing smart antenna apparatus 16 with base station transceiver 24. Smart antenna apparatus 16 includes a radio wire input 64, a splitter 50, control channel monitoring module 104, and processing module 62. Radio wire input 64 is operable to be coupled to one or more radio signal wires 42 to receive radio signals communicated from base station transceiver 24. In particular, radio wire input 64 may be operable to receive signals communicated in a control channel, including control signals communicated within the control channel.

Splitter 50 is operable to split the path of a signal into two or more paths. For example, splitter 50 may be a bi-directional or a tri-directional coupler. In the embodiment shown in FIG. 5, splitter 50 is a bi-directional coupler operable to divide an input path 66 of radio signals received from radio wire input 64 into a first output path 68 directed toward antenna unit 18 and a second output path 70 directed toward first filter 52. Like input path 66, output paths 68 and 70 may be operable to communicate signals received by radio wire input 64. In addition, splitter 50 may be operable to divide signal path 66 without interfering with signals communicated from signal path 66 to signal path 68. Thus, control channel monitoring module 104 may be operable to passively monitor, or receive, the control signals being communicated from base station transceiver 24 to antenna unit 40. For example, the control signals may be monitored without using active components. In one embodiment, the control signals being communicated from base station transceiver 24 to antenna unit 40 are monitored without amplifying the control signals.

In the embodiment shown in FIG. 5, control channel monitoring module 104 comprises a first filter 52, a signal mixer 54, a second filter 56, a receiver 58, and a sampler 60. First filter 52 may include an attenuator 72 and a bandpass filter 74. Attenuator 72 is operable to reduce the amplitude of radio signals by a predetermined amount without introducing distortion to the signals. Bandpass filter 74 allows a specific band of frequencies to pass through while blocking or absorbing other frequencies outside the specified band. In one embodiment, bandpass filter 74 allows the band of frequencies defined by the downlink control frequency to pass through, while blocking or absorbing other frequencies.

Signal mixer 54 is operable to mix, or combine, the signals received from first filter 52 with a conversion signal 76 in order to convert the signals from one frequency to another frequency (in other words, from one frequency band to another frequency band). Signal mixer 54 may be operable to convert the signals from the downlink frequency at which the signals were transmitted from base station transceiver 24 to the corresponding uplink frequency at which the signal may be received by receiver 58. For example, as discussed above, in the P/E/R-GSM 900 standard, downlink frequencies are offset from their corresponding uplink frequencies by 45 MHz. Thus, as shown in FIG. 2, conversion signal 76 may be approximately a 45 MHz signal such that signal mixer 54 is operable to convert the signal from a downlink frequency to an uplink frequency which may be received by receiver 58. It should be understood that in some embodiments, conversion signal 76 is defined according to the offset between downlink frequencies and corresponding uplink frequencies according to the particular communication environment. For example, in a GSM 850 environment, as in the P/E/R-GSM 900 environment, conversion signal 76 may be approximately a 45 MHz signal. In a GSM 1900 environment, conversion signal 76 may be approximately an 80 MHz signal. In a GSM 1800 environment, conversion signal 76 may be approximately a 95 MHz signal. In a GSM 480/450 environment, conversion signal 76 may be approximately a 10 MHz signal.

Second filter 56 may include a receiving frequency bandpass filter 78 and an attenuator 80. Like bandpass filter 74, bandpass filter 78 allows a specific band of frequencies to pass through while blocking or absorbing other frequencies outside the specified band. In one embodiment, bandpass filter 78 allows the band of frequencies defined by the corresponding uplink frequency to pass through, while blocking or absorbing other frequencies. Like attenuator 72, attenuator 80 is operable to reduce the amplitude of radio signals by a predetermined amount without introducing distortion to the signals.

Receiver 58 is operable to receive signals from second filter 56 and is generally operable to receive radio signals within a particular frequency band. In one embodiment, receiver 58 is operable to receive signals within the uplink frequency bandwidth (in other words, the bandwidth of signals transmitted by mobile stations 15). In some embodiments, receiver 58 is similar or identical to other receivers used by smart antenna apparatus 16 to receive radio signals from mobile stations 15, such as beam receivers 112. In a particular embodiment, receiver 58 is one of the beam receivers 112.

Sampler 60 is operable to convert signals from analog to digital. Sampler 60 may convert analog signals received by receiver 58 to digital signals such that the signals may be processed by processing module 62.

Processing module 62 is operable to process radio signals using one or more synchronization algorithms 82. In one embodiment, processing module 62 is operable to execute one or more synchronization algorithms 82 using digital signals received from sampler 60 as input to synchronize smart antenna apparatus 16 with base station transceiver 24 in time and frequency. In the embodiment shown in FIG. 3, synchronization algorithms 82 include a coarse timing synchronization algorithm 86, a frame synchronization algorithm 88, a fine timing synchronization algorithm 90, and a fine frequency synchronization algorithm 92. Coarse timing synchronization algorithm 86 and frame synchronization algorithm 88 generally perform rough synchronizations, while fine timing synchronization algorithm 90 and fine frequency synchronization algorithm 92 are generally fine tuning algorithms. These particular synchronization algorithms 82 are discussed in greater detail below with reference to FIGS. 4 and 5. In one embodiment, processing module 62 is operable to execute one or more synchronization algorithms 82 in order to locate the control signals within the control frequency and to use certain control signals, such as time and frequency synchronization signals, to synchronize smart antenna apparatus 16 with base station transceiver 24.

Base station transceiver 24 may include one or more radio wire outputs 84 operable to receive one or more radio signal wires 42. Thus, smart antenna apparatus 16 may be coupled to base station transceiver 24 via one or more radio signal wires 42.

Figure 6:
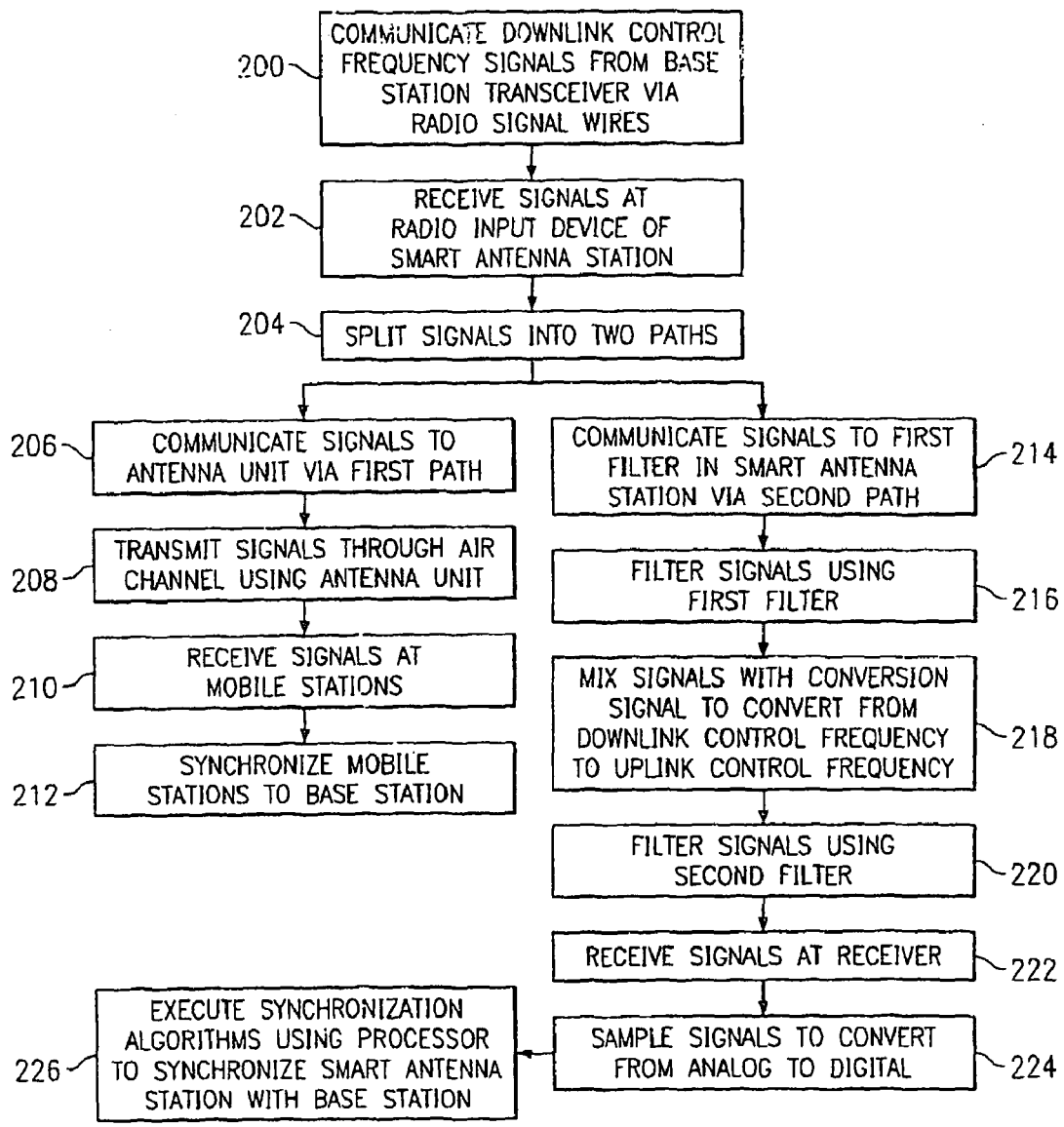
FIG. 6 illustrates a method for monitoring control signals being communicated from a base station transceiver to mobile stations in accordance with an embodiment of the present invention.

FIG. 6 illustrates a method of synchronizing smart antenna apparatus 16 with base station transceiver 24 using radio frequency control signals transmitted by base station transceiver 24. Generally, base station transceiver 24 transmits radio signals via radio signal wires 42 in a control frequency intended for one or more mobile stations 15. The control frequency includes a control channel used to communicate control signals including synchronization signals. Smart antenna apparatus 16 splits the path of the radio signals into a first path directed toward antenna unit 18 and a second path directed toward smart antenna receiver 58 and processor 62. The radio signals are converted from a transmission (or downlink) frequency to a receiving (or uplink) frequency before being received by receiver 58. Processor 62 executes one or more synchronization algorithms using the radio signals (which include the control signals) as input to synchronize smart antenna system 16 with base station transceiver 24 in time and frequency with a high degree of accuracy. Thus, smart antenna system 16 may be accurately synchronized with base station transceiver 24 using radio signals received from base station transceiver 24 via radio signal wires 42.

At step 200, downlink control frequency signals are communicated from base station transceiver 24 via one or more radio signal wires 42. The control frequency signals are generally intended to be received by one or more mobile stations 15 via wireless transmission, and may include control signals within a control channel as well as voice signals within one or more traffic channels. The control signals may include synchronization data, such as time synchronization bursts and frequency synchronization bursts, that may be used to synchronize mobile stations 15 with base station transceiver 24 in time and/or frequency.

The downlink control frequency signals communicated from base station transceiver 24 are received at smart antenna apparatus 16 via the one or more radio signal wires 42 at step 202. As shown in the embodiment of FIG. 5, the signals are received by radio wire input 64. The signals are then communicated through splitter 50 at step 204. The signals enter splitter 50 via signal path 66 which is divided by splitter 50 into first path 68 and second path 70. As discussed above, a first path 68 is directed toward antenna unit 18 such that the downlink control frequency signals, including control signals, may be communicated to mobile stations 15, and a second signal path 70 is directed toward first filter 52 such that the downlink control frequency signals, including control signals, may be communicated to processing module 62.

Steps 206 through 212 illustrate the communication of the control frequency signals, in particular the control channel signals, from splitter 50 to mobile stations 15 for synchronizing mobile stations 15 with base station transceiver 24. At step 206, the control frequency signals are communicated from splitter 50 to antenna unit 18 via path 68 which may include one or more radio signal wires 40. The signals are then transmitted by antenna unit 18 at step 208. At step 210, the signals are received by one or more mobile stations 15. Mobile stations 15 use the control signals communicated in the control channel of the downlink control frequency to synchronize themselves with base station transceiver 24 in time and/or frequency at step 212. Mobile stations 15 may use one or more synchronization algorithms in order to synchronize themselves with base station transceiver 24.

Steps 214 through 226 illustrate the communication of the downlink control frequency signals, in particular the control signals, from splitter 50 to processing module 62 for synchronizing smart antenna apparatus 16 with base station transceiver 24. At step 214, the signals are communicated from splitter 50 to first filter 52 via path 70. The signals are filtered by first filter 52 at step 216. In one embodiment, first filter 52 includes attenuator 72 and band pass filter 74. In this embodiment, the amplitude of the signals is reduced by attenuator 72, and frequencies outside the band of frequencies defined by the downlink control frequency are blocked or absorbed by band pass filter 74.

At step 218, the signals are communicated to signal mixer 54 and mixed, or combined, with a conversion signal 76 in order to convert the signals from one frequency to another frequency. For example, the signals may be converted from the transmission (or downlink) frequency at which the signals were transmitted from base station transceiver 24 to a corresponding receiving (or uplink) frequency at which the signals may be received by receiver 58. For example, in a P/E/R-GSM 900 or a GSM 850 environment in which corresponding uplink and downlink frequencies are offset by 45 MHz, conversion signal 76 may be approximately a 45 MHz signal.

The signals output by mixer 54 are filtered by second filter 56 at step 220. In one embodiment, second filter 56 includes bandpass filter 78 and attenuator 80. In this embodiment, frequencies outside the band of frequencies defined by the receiving frequency are blocked or absorbed by band pass filter 78, and the amplitude of the resulting signals is reduced by attenuator 80.

At step 222, the radio signals, which have been converted to the receiving frequency and filtered, are received by receiver 58. The received signals are converted from analog to digital signals by sampler 60 at step 224. The digital signals are then received by processor 62, which applies one or more synchronization algorithms 82 to the signals to synchronize smart antenna apparatus 16 with base station transceiver 24 in time and frequency.

Synchronization algorithms 82 are discussed in greater detail below with reference to FIGS. 7 and 8. Synchronization algorithms 82 may be applied to radio signals received from base station transceiver 24 during power-up of smart antenna apparatus 16 to achieve accurate synchronization, such as discussed below with reference to FIG. 7. In addition, one or more of the synchronization algorithms 82 may be applied to radio signals received from base station transceiver 24 during steady state operation of smart antenna apparatus 16 to maintain the accurate synchronization, such as discussed below with reference to FIG. 8.

Figure 7:
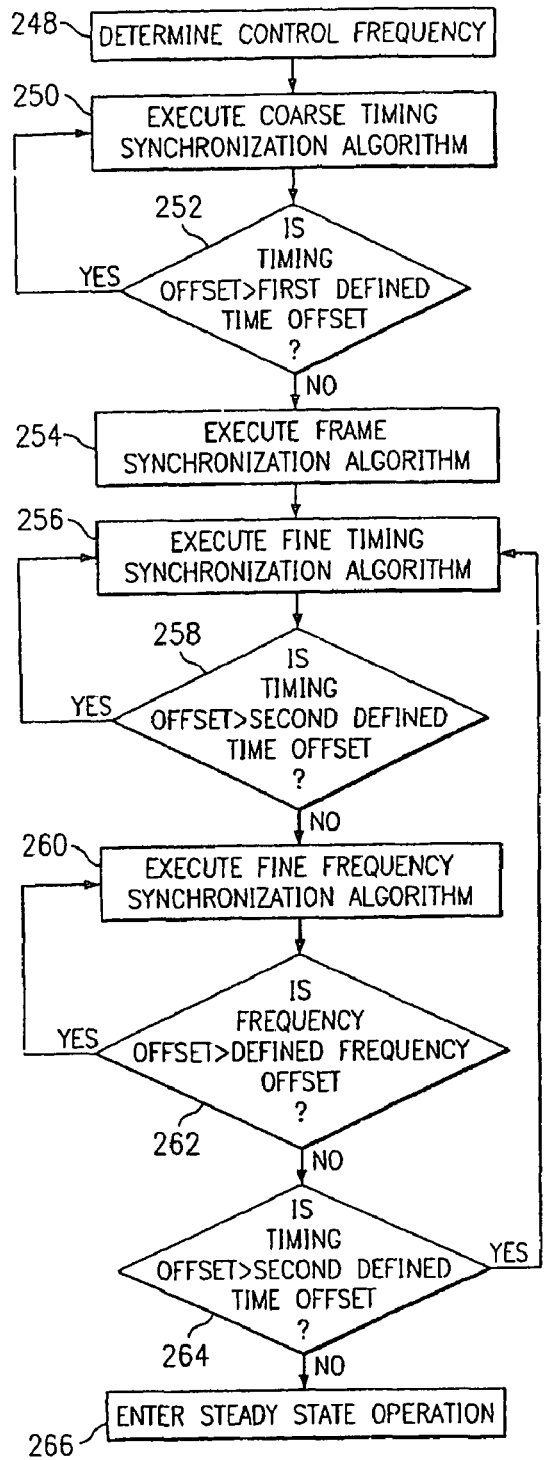
FIG. 7 illustrates a method for synchronizing the smart antenna apparatus with the base station transceiver during start-up in accordance with an embodiment of the present invention.

FIG. 7 illustrates a method of synchronizing smart antenna apparatus 16 with base station transceiver 24 in time and frequency during power-up of smart antenna apparatus 16. The following discussion concerns one or more embodiments in a GSM environment. It should be understood that in other embodiments, similar methods may be used for other standards, for example CDMA (Code Division Multiple Access) standards such as IS-95A and IS-95B, CDMA 2000, WCDMA, TD SCDMA, TETRA, and TDMA (Time Division Multiple Access) standards such as IS-136 and IS-54, without departing from the scope of the present invention.

At step 248, processor 62 determines the control frequency being used by base station system 12. In some embodiments, processor 62 uses a control frequency detector 94 to determine the control frequency. Control frequency detector 94 may be operable to determine the control frequency by determining the average energy being transmitted at each frequency band within an appropriate bandwidth. For example, in a GSM environment, control frequency detector 94 may determine the average energy being transmitted at each 200 kHz frequency band within the 25 MHz bandwidth of the GSM standard. The frequency band having the highest average energy level is determined to be the control frequency.

At step 250, processor 62 may execute coarse timing synchronization algorithm 86 to roughly synchronize smart antenna apparatus 16 with base station transceiver 24 in time. Coarse timing synchronization algorithm 86 may be operable to locate the control channel within a multi-frame. In addition, coarse timing synchronization algorithm 86 may be operable to synchronize smart antenna apparatus 16 with base station transceiver 24 with sufficient accuracy such that the location of a particular time slot within a particular frame of the multi-frame may be determined by frame synchronization algorithm 88, as described below in step 254.

Coarse timing synchronization algorithm 86 samples a series of time slot intervals for a period equal to a GSM multi-frame. The beginning of the first time slot interval in the series is determined randomly. In general, coarse timing synchronization algorithm 86 attempts to locate a frequency correction burst (FCCH), which is transmitted in the control slot in every tenth frame. To locate a frequency correction burst, a correlation is performed between the signal received at each time slot interval and the known frequency correction burst. The correlation between the received signals and the expected frequency correction burst FCCH(n) can be determined using the following equation:

$$\text{FCCH\_CORR}[i, j] = \sum_{n=0}^{N} Y_{i,j}(n) * FCCH^H(N - n) \quad (1)$$

where:

i indicates the slot number in a GSM multi-frame (i=(0-51 frames)*8 time slots per frame);

j indicates the slot sync pulse offset from the first random selection (j=0 . . . (N/offset_delta));

Y(n) is the signal received by processor 62 from sampler 60;

FCCH(n) as the expected frequency correction burst as defined in GSM standard 05.02; and FCCH_CORR[i,j] is the correlation between the received signals Y(n) and the expected frequency burst FCCH(n).

The offset ĵ that will yield maximum correlation can be written as:

$$\hat{j} = \arg\max_j \left( \sum_{k=0}^{MULTI\_FRAME} FCCH\_CORR[k, j] \right) \quad (2)$$

After determining the offset ĵ using Equation (2), the beginning of the series of time slot intervals should be changed to the location of ĵ that yields the maximum correlation.

At step 252, it may be determined whether the offset in time between smart antenna apparatus 16 and base station system 12 is greater than a specific offset. If so, step 250 may be repeated until the offset is less than or equal to the specific offset. If the offset is less than or equal to the specific offset, the method continues to step 254.

At step 254, processor 62 executes frame synchronization algorithm 88 to locate a particular time slot in a particular frame of a multi-frame. In particular, synchronization algorithm 88 may be operable to determine the location of the first time slot, or time slot 0, in a GSM multi-frame. In one embodiment, frame synchronization algorithm 88 may not be executed until coarse timing synchronization algorithm 86 has been executed. Frame synchronization algorithm 88 samples a GSM time slot from the point ĵ determined using coarse timing synchronization algorithm 86 in step 250 above. The sampled GSM slot is correlated with a frequency correction burst (FCCH) using the following equation:

$$FCCH\_CORR[i] = \sum_{n=0}^{N} Y_i(n) * FCCH^H(N-n) \quad (3)$$

where:
 i indicates the slot number in a GSM multi-frame (i=(0-51 frames)*8 time slots per frame);
 Y(n) is the signal received by processor 62 and sampled for the interval of a GSM time slot.
 FCCH(n) is the expected frequency correction burst as defined in GSM standard 05.02; and
 FCCH_CORR[i] is the correlation between the received signal Y(n) and the expected frequency correction burst FCCH(n).

The beginning of a GSM multi-frame (î), which may be referred to as slot 0, may be determined as follows:

$$\hat{i} = \arg\max_i (FCCH\_CORR[i] + FCCH\_CORR[i+88]) \quad (4)$$

At step 256, processor 62 may execute fine timing correction algorithm 90. Fine timing correction algorithm 90 is operable to sample the signal received from sampler 60 during the time slot in a multi-frame in which a synchronization burst (SCH) is expected according to GSM standards, such as GSM standard 05.02. The correlation between the signal received from sampler 60 and the expected synchronization burst can be determined as follows:

∀i0<i<correlation_window:

$$SCH\_CORR[i] = \sum_{n=0}^{N} Y(n0+i+n) * SCH\_SEQ^H(N-n) \quad (6)$$

where:
 correlation_window indicates the length of the correlation search, for example a particular number of frames;
 Y(n) is the signal received by processor 62 and sampled for the interval of a GSM time slot.
 SCH_SEQ(n) is the expected synchronization burst according to GSM standard 05.02; and
 SCH_CORR[i] is the correlation between the received signal Y(n) and the expected synchronization burst SCH(n).

The correct timing offset (î) may be determined as follows:

$$\hat{i} = \arg\max_i (SCH\_CORR(i)) \quad (7)$$

The fine time correction d may be determined as follows:

$$d = \frac{(SCH\_CORR[i-1] - SCH\_CORR[i+1]) * \Delta/2}{(SCH\_CORR[i-1] + SCH\_CORR[i+1] - 2*SCH\_CORR[i])} \quad (8)$$

where Δ is the time between two samples. The fine time correction offset may then be calculated from the expected location of the synchronization burst (SCH) as follows:

$$\text{Fine time correction} = (\hat{i}+d) - \text{expected SCH} \quad (9)$$

In some embodiments, fine timing synchronization algorithm 90 synchronizes smart antenna apparatus 16 with base station transceiver 24 with an accuracy of less than about 1 GSM bit, which is approximately equal to 3.7 microseconds. In other words, smart antenna apparatus 16 is offset from base station system 12 by less than 1 GSM bit. In one embodiment, fine timing synchronization algorithm 90 is operable to synchronize smart antenna apparatus 16 with base station transceiver 24 with an accuracy of less than one quarter of one GSM bit, which is approximately equal to 0.9 microseconds.

At step 260, processor 62 may execute frequency synchronization algorithm 92 to synchronize smart antenna apparatus 16 with base station transceiver 24 in frequency. Frequency synchronization algorithm 92 is based on a Fourier's analysis of a frequency correction burst (FCCH) in the signal received from sampler 60. The Fast Fourier Transform, FFT_FCCH [K] of Y(n), may be determined as follows:

$$FFT\_FCCH[k] = \sum_{n=0}^{N-1} Y(n) * EXP\left(-\frac{j*2*\Pi*k*n}{N}\right) \quad (10)$$

where Y(n) is the frequency correction burst received by processor 62 and sampled for the interval of a GSM time slot, and k is the frequency index. The frequency correction burst (FCCH) frequency. (f̂) may be determined as follows:

$$\hat{f} = \arg\max_{FFT\_SIZE/2 < f < FFT\_SIZE} (FFT\_FCCH[f]) \quad (11)$$

The fine frequency correction d may be determined as follows:

$$d = \frac{(FFT\_FCCH[k-1] - FFT\_FCCH[k+1]) * \Delta/2}{(FFT\_FCCH[k-1] + FFT\_FCCH[k+1] - 2*FFT\_FCCH[k])} \quad (12)$$

where Δ is the frequency resolution of the fast Fourier transform (FFT). The frequency offset (ΔF) may then be determined as follows:

$$\Delta F = \frac{1625/24 \text{ KHz}}{\left(\left(\hat{f} + d\right) - \text{fft\_size}/2\right)} \quad (13)$$

The frequency of smart antenna apparatus 16 may then be corrected by the frequency offset ($\Delta F$). In one embodiment, frequency synchronization algorithm 92 is operable to synchronize smart antenna apparatus 16 with base station transceiver 24 within an accuracy of about 50 Hz.

At step 262, it may be determined whether the frequency offset in time between smart antenna apparatus 16 and base station system 12 is greater than a defined frequency offset. If so, step 260 may be repeated until the offset is less than or equal to the defined frequency offset. If the offset is less than or equal to the defined frequency offset, the timing synchronization may be re-checked at step 264. The timing synchronization may be re-checked at step 264 because the time synchronization and the frequency synchronization may be related such that smart antenna system 16 must be synchronized in time in order to be synchronized in frequency, and vice versa. The accuracy of the time synchronization achieved at 256 may be affected by the frequency synchronization performed in 260. Thus, the time synchronization is re-checked as step 264 to ensure that the time offset between smart antenna apparatus 16 and base station system 12 is still less than or equal to the second defined offset. If so, smart antenna apparatus 16 may enter steady state operation at step 266. If not, steps 256 through 264 are repeated until smart antenna apparatus 16 is synchronized in both time and frequency.

The time and frequency synchronization between smart antenna apparatus 16 and base station system 12 achieved using the methods of FIG. 4 may be maintained during steady state operation as described below with reference to FIG. 5.

Figure 8:
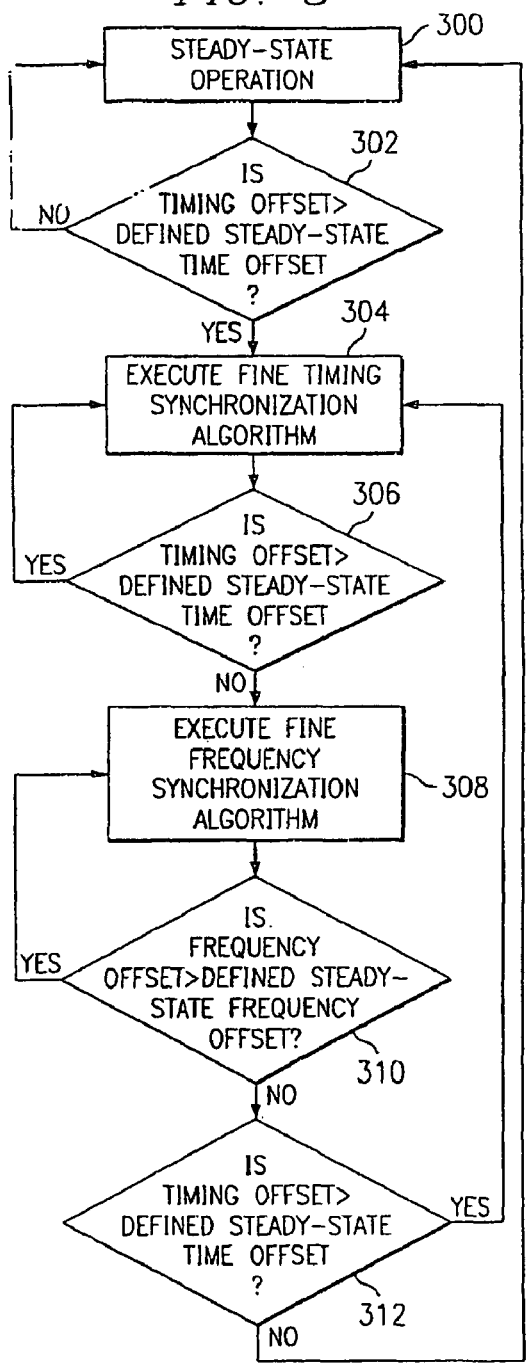
FIG. 8 illustrates a method for maintaining the smart antenna apparatus in synchronization with the base station transceiver during steady-state operation in accordance with an embodiment of the present invention.

FIG. 8 illustrates a method of maintaining smart antenna apparatus 16 and base station transceiver 24 synchronized in time during steady state operation of the smart antenna apparatus. At step 300, smart antenna apparatus 16 operates in steady state. For example, smart antenna apparatus 16 may operate in steady state after being synchronized in time and frequency during power-up, as discussed above with reference to FIG. 7.

At step 302, smart antenna apparatus 16 may check the time synchronization of smart antenna apparatus 16 periodically, randomly, or in response to some event. It is determined whether the time offset between smart antenna apparatus 16 and base station system 12 is greater than a defined steady-state time offset. The defined steady-state time offset may be the same as, or different than, the second defined offset used in synchronizing during power-up, as discussed above with reference to step 258 in FIG. 7.

If the time offset determined at step 302 is less than or equal to the defined steady-state time offset, no time synchronization correction is needed and smart antenna system remains in steady-state operation. However, if the time offset determined at step 302 is greater than the defined steady-state time offset, the time and/or frequency synchronization may be corrected at steps 304 through 314.

In the embodiment shown in FIG. 8, steps 304 through 312 are essentially the same as steps 256 through 264 of FIG. 7. Processor 62 executes fine timing synchronization algorithm 90 to adjust or correct the time synchronization at step 304. The time synchronization is then re-checked at step 306, and if necessary, re-synchronized at step 304, until the time offset is less than or equal to the defined steady-state time offset. Fine frequency synchronization algorithm 92 is executed at step 308, and the frequency offset between smart antenna apparatus 16 and base station system 12 is checked against a defined steady-state frequency offset at step 310. The defined steady-state frequency offset may be the same as, or different than, the defined frequency offset used in synchronizing during power-up, as discussed above with reference to step 262 in FIG. 7.

Since the frequency synchronization performed at step 308 may affect the time synchronization of smart antenna apparatus 16, the time synchronization is re-checked at step 312 to ensure that the time offset between smart antenna apparatus 16 and base station system 12 is still less than or equal to the defined steady-state time offset. If so, smart antenna apparatus 16 may return to steady state operation. If not, steps 304 through 310 are repeated until smart antenna apparatus 16 is synchronized in both time and frequency.

According to the method shown in FIG. 8, smart antenna apparatus 16 may be maintained in accurate time and frequency synchronization during steady-state operation of smart antenna apparatus 16. In some embodiments, only fine tuning, such as using fine timing synchronization algorithm 90 and fine frequency synchronization algorithm 92, is required during steady state operation. Thus, in some embodiments, it is not necessary to execute coarse timing synchronization algorithm 86 or frame synchronization algorithm 88 during steady state operation of smart antenna apparatus 16.

Figure 9:
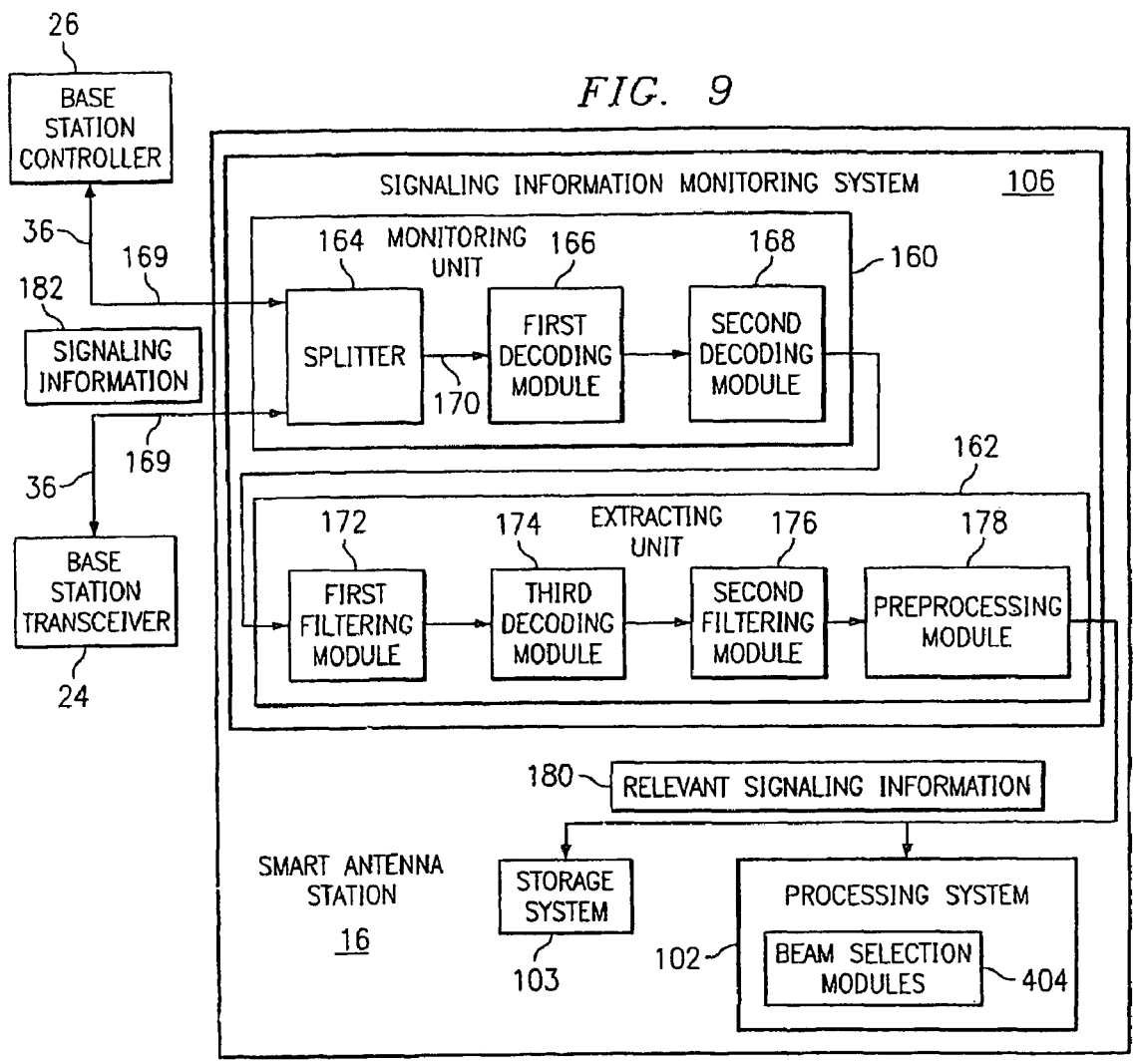
FIG. 9 illustrates a system for monitoring signaling information being communicated via an interface between a base station transceiver and a base station controller in accordance with an embodiment of the present invention.
Figure 10:
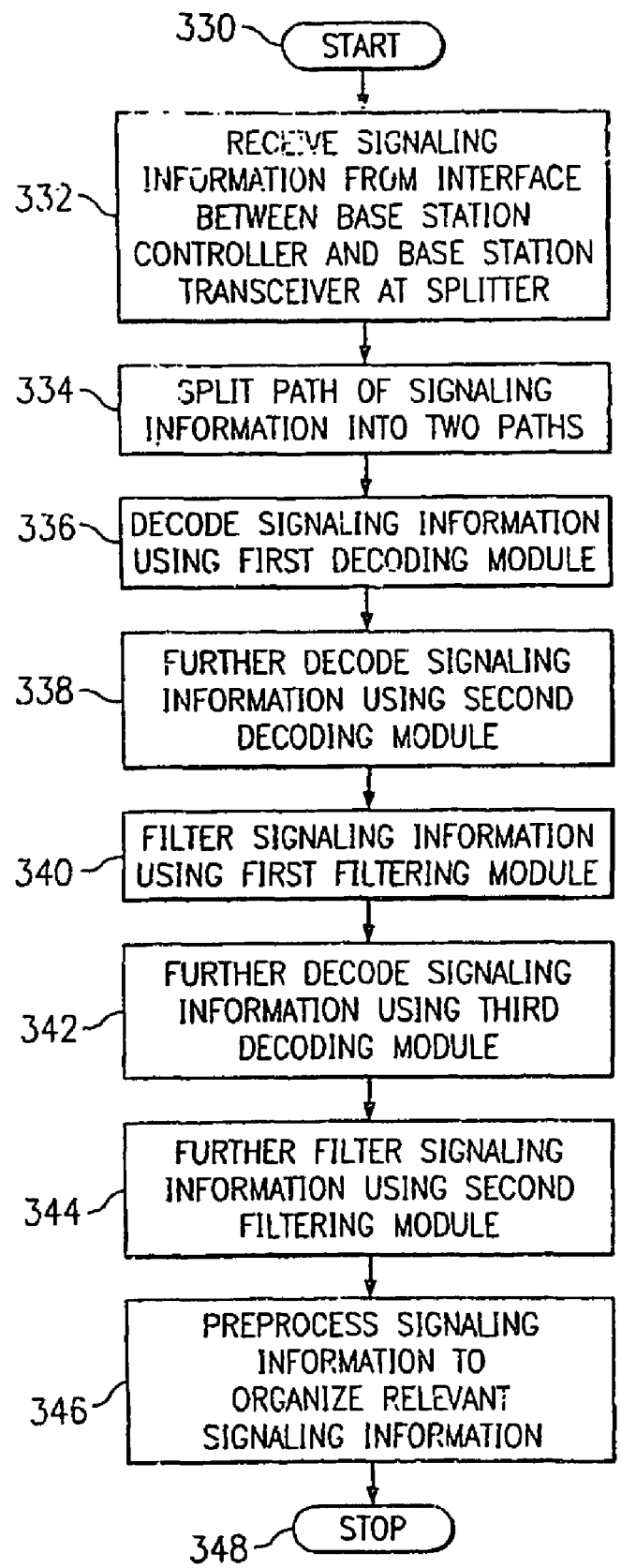
FIG. 10 illustrates a method for monitoring signaling information being communicated via the interface illustrated in FIG. 9.

FIGS. 9 and 10 illustrate an example system and method for collecting signaling information being communicated between base station controller 26 and base station transceiver 24, extracting relevant information from the signaling information, and communicating the relevant information to processing system 102 to be used as an input in making beam selection decisions.

FIG. 9 illustrates an embodiment of a smart antenna system 16 operable to receive and process signaling information being communicated between base station controller 26 and base station transceiver 24. In general, signaling information monitoring system 106 may be coupled to interface 36 such that signaling information monitoring system 106 may receive, or monitor signaling information being communicated between base station controller 26 and base station transceiver 24 via interface 36. This information may then be filtered and/or otherwise processed to determine relevant signaling information 180 which may be used by smart antenna apparatus 16 in performing smart antenna functions, such as making beam selection decisions.

As discussed above with reference to FIG. 1, base station controller 26 and base station transceiver 24 may communicate traffic information and signaling information with each other via interface 36. Interface 36 may support one or more communication channels. Interface 36 may support one or more traffic channels for communicating voice or data signals and one more signaling channels for communicating signaling, or control, information. The signaling, or control, information may comprise information regarding the one or more traffic channels. In a GSM environment, interface 36 may comprise an A-bis interface between a Base Station Controller (BSC) and a Base Transceiver Station (BTS). Interface 36 may comprise one or more E1/T1 cables. In a 3G environment, interface 36 may comprise an LUB interface between a Radio Network Controller (RNC) and a Node B base station.

Smart antenna system 16 may comprise signaling information monitoring system 106, processing system 102, and storage system 103. Signaling information monitoring system 106 may comprise a monitoring unit 160 and an extracting unit 162. Monitoring unit 160 is generally operable to collect, or monitor, information being communicated between base station controller 26 and base station transceiver 24 via interface 36, and extracting unit 162 is generally operable to extract relevant signaling information 180 from the information collected by monitoring unit 160.

Monitoring unit 160 may comprise a signal splitter 164, a first decoding module 166, and a second decoding module 168. In one embodiment, monitoring unit 160 is an LAPD (Link Access Procedure on the D-Channel) monitoring unit. Signal splitter 164 is generally operable to couple signaling information monitoring system 106 to interface 36. In particular, signal splitter 164 is operable to split interface 36 to provide a first path 169 connecting base station controller 26 and base station transceiver 24 and a second path 170 for signaling information 182 to be processed by signaling information monitoring system 106. Signal splitter 164 may comprise a T-connection that creates first path 169 and second path 170.

Signal splitter 164 may be operable to split interface 36 to provide path 170 for signaling information 182 without affecting the communication of signaling information 182 or traffic information between base station controller 26 and base station transceiver 24 via interface 36. In one embodiment, signal splitter 164 connects signaling information monitoring module 106 with interface 36 using high impedance such that signal splitter 164 does not interfere with interface 36, even if smart antenna apparatus 16 is turned off or not operational. In other words, the monitoring of signaling information 182 being communicated between base station controller 26 and base station transceiver 24 may be entirely passive. For example, the monitoring of signaling information 182 may be done without using active components. In one embodiment, the monitoring of signaling information 182 is done without amplifying the signal being communicated via interface 36.

Thus, smart antenna apparatus 16 may be operable to monitor signaling information 182 being communicated between base station transceiver 24 and base station controller 26 without affecting, or disturbing, the communication of the signaling information 182 between base station transceiver 24 and base station controller 26. In some embodiments, smart antenna apparatus 16 is operable to monitor signaling information 182 without introducing any delay in the communication of signaling information 182 between base station transceiver 24 and base station controller 26.

In addition, smart antenna apparatus 16 may be non-obtrusively coupled to interface 36. Thus, in some embodiments, the components of base station system 12, including base station transceiver 24 and base station controller 26, do not need to be modified, altered, or reconfigured in order for smart antenna apparatus 16 to monitor signaling information 182 being communicated between base station controller 26 and base station transceiver 24. Thus, the cost and labor of modifying or altering base station system 12 and/or dealing or negotiating with the manufacturer of the components of base station system 12, such as base station transceiver 24 and base station controller 26, is reduced or, in some embodiments, eliminated.

First decoding module 166 is operable to receive signals from interface 36 via path 170. First decoding module 166 is generally operable to perform a first level of decoding of signals received from interface 36. In some embodiments, first decoding module 166 is an E1/T1 decoding module. Second decoding module 168 is operable to further decode data received from first decoding module 166. In some embodiments, second decoding module 168 is a Layer 2 (LAPD) (Link Access Procedure on the D-Channel) decoder.

Extracting unit 162 may comprise a first filtering module 172, a third decoding module 174, a second filtering module 176, and a pre-processing module 178. In one embodiment, extracting unit 162 is an LAPD processing unit. Extracting unit 162 is generally operable to extract relevant information from data received from monitoring unit 160. In one embodiment, extracting unit 162 is operable to extract relevant information available only at A-bis levels higher than the E1/T1 physical level.

First filtering module 172 is operable to filter data received from second decoding module 168. In some embodiments, first filtering module 172 is an LAPD filtering module. Third decoding module 174 is operable to decode data received from first filtering module 172. In some embodiments, third decoding module 174 is a Layer 3 BTSM (Base Transceiver Station Management) decoding module. Second filtering module 176 is operable to filter or decode data received from third decoding module 174. In some embodiments, second filtering module 176 is an IE (Information Elements) filtering module.

Preprocessing module 178 is operable to organize the data received from second filtering module 176 such that the data may be used by one or more modules or systems of smart antenna apparatus 16 for performing the operations of smart antenna apparatus 16. For example, preprocessing module 178 may be operable to organize the data such that the processing system 102 may use the data in making beam selection determinations. In one embodiment, preprocessing module 178 may be operable to organize the data into categories of transactions which may be relevant to one or more modules or systems of smart antenna apparatus 16. For example, the categories of transactions may include registration, mobile originated calls (MOC), mobile terminated calls (MTC), location update, and handover.

The information or data output from signaling information monitoring system 106 may be generally referred to as relevant signaling information 180. It should be understood that the term relevant signaling information 180 as used throughout this document may refer to all or any portion of the information output from signaling information monitoring system 106.

Relevant signaling information 180 may be used for various functions within smart antenna system 14, and may include such information as frequency hopping information, mobile originated call (MOC) information, mobile terminated calls (MTC) information, mobile frequency information, mobile timing information, mobile sequence information, and handover information. For example, relevant signaling information 180 may be used by processing system 102 in making beam selection determinations. Relevant signaling information 180 may be used to simplify or reduce the processing time required for determining a correlation quality corresponding to each narrow beam 34 for use in making beam selection decisions (for example, see the discussion below regarding FIGS. 19 and 21). In addition, relevant signaling information 180 may be used to verify beam selections determined by one or more beam selection modules. In some embodiments, relevant signaling information 180 includes information relevant to frequency hopping, which may be used to verify beam selections determined by one or more beam selection modules and/or select an appropriate beam according to the frequency hopping information (for example, see discussion below regarding FIGS. 17 and 18). As another example, relevant signaling information 180 may be used to synchronize or check the synchronization of smart antenna apparatus 16 with base station transceiver 24.

In some embodiments, signaling information 182 being communicated between base station controller 26 and base station transceiver 24 is not encrypted which allows signal information monitoring system 106 to decode signaling information 182. Thus, smart antenna system 14 is operable to collect relevant information regarding traffic channels in a practical and relatively inexpensive manner. Smart antenna system 14 provides an advantage over other smart antenna systems which collect information regarding traffic channels from a higher level interface, such as the A-Interface, since such systems often require long and expensive cabling. In addition, smart antenna system 14 provides an advantage over other smart antenna systems which collect information regarding traffic channels from an air interface, such as the M-Air Interface, since such systems often provide inaccurate results and are more expensive, particularly in certain environments, such as frequency hopping or GPRS (Global Packet Radio Service) environments, for example.

FIG. 10 illustrates a method of collecting relevant signaling information in accordance with an embodiment of the present invention. At step 330, the method starts. At step 332, signaling information 182 being communicated between base station controller 26 and base station transceiver 24 via interface 36 is received by signaling information monitoring system 106. Signaling information 182 may be received by splitter 164. In a GSM environment, interface 36 is an A-bis interface. In a 3G environment, interface 36 is a LUB interface. At step 334, splitter 164 splits the path of signaling information 182 into a first path between base station controller 26 and base station transceiver 24 and a second path 170 for use by signaling information monitoring system 106.

At step 336, first decoding module decodes the signaling information 182 received via path 170. At step 338, second decoding module 168 further decodes data received from first decoding module 166. At step 340, first filtering module 172 filters the data received from second decoding module 168. At step 342, third decoding module 174 further decodes data received from first filtering module 172. At step 344, second filtering module further filters or decodes data received from third decoding module 174. At step 346, preprocessing module 178 organizes the data received from second filtering module 176 such that the data may be used by one or more modules or systems of smart antenna apparatus 16. At step 348, the method stops.

Figure 11:
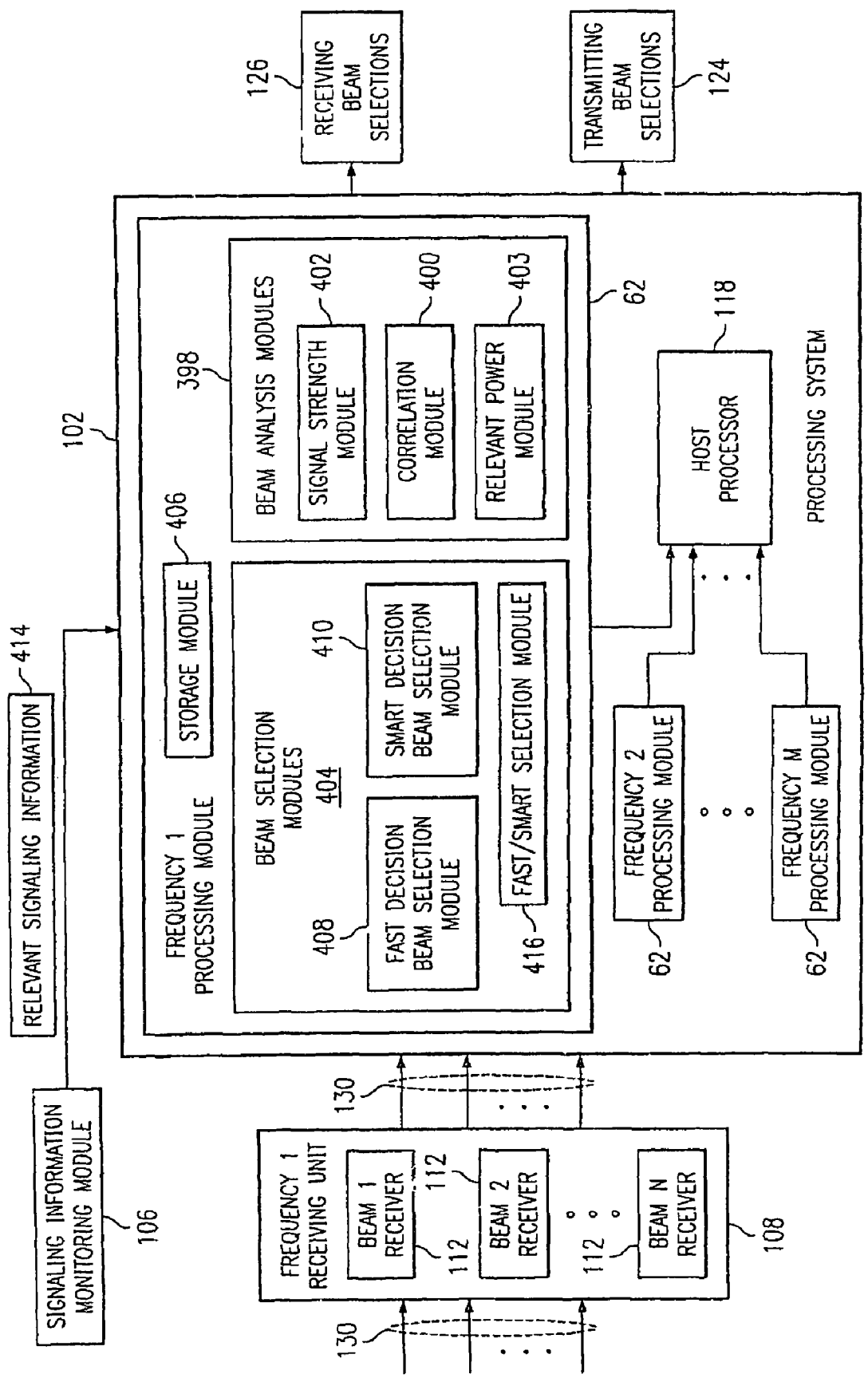
FIG. 11 illustrates a system for determining beam selections with the smart antenna apparatus of FIG. 2.

FIGS. 11 through 23 illustrate example embodiments of systems and methods for selecting beams in a smart antenna system. FIG. 11 illustrates a system for determining receiving beam selections 126 and transmitting beam selections 124 in one frequency in an embodiment of the present invention. As discussed above with reference to FIG. 3, receiving unit 108 may comprise a beam receiver 112 corresponding with each uplink beam 130 associated with smart antenna system 14. For example, in one embodiment, receiving unit 108 comprises seven beam receivers 112, each corresponding with one of seven uplink beams 130 associated with smart antenna system 14. And as discussed above with reference to FIG. 9, signaling information monitoring system 106 is operable to obtain relevant signaling information by monitoring the signaling information being communicated between base station transceiver 24 and base station controller 26.

As discussed above with reference to FIG. 4, processing system 102 comprises a processing module 62 for each frequency used by base station transceiver 24 as well as a central processing unit 188. Each processing module 62 comprises one or more beam analysis modules 398, one or more beam selection modules 404, and a storage module 406. Beam analysis modules 398 are generally operable to analyze received signals to determine one or more characteristics or parameters, which are used by beam selection modules 404 in determining receiving beam selections 126 and/or transmitting beam selections 124.

In the embodiment shown in FIG. 11, beam analysis modules 398 comprise a correlation module 400, a signal strength module 402, and a relevant power module 403. Correlation module 400 is generally operable to correlate received signals with known signals to determine the quality of the received signals. In one embodiment, correlation module 400 is operable to correlate signal sequences received via one or more beams with one or more known training sequences in order to determine a correlation quality of each of the beams. These correlation qualities may be used as input in beam selection module 404 for use in selecting receiving beam selections 126 and/or transmitting beam selections 124. Correlation module 400 is described below in greater detail with reference to FIG. 19.

Signal strength module 402 is generally operable to determine the signal strength, or power, of received signals. In some embodiments, signal strength module 402 is operable to determine the signal strength of the uplink beam 130 received from each beam receiver 112 in frequency receiving unit 108. For example, signal strength module 402 may determine a received signal strength indicator (RSSI) for each uplink beam 130. In one embodiment, signal strength module 402 is operable to determine an average signal strength for each uplink beam 130 over a period of time. Like the correlation qualities determined by correlation module 400, the signal strengths determined by signal strength module 402 may be used as an input in beam selection module 404 for use in selecting receiving beam selections 126 and/or transmitting beam selections 124.

Relevant power module 403 is generally operable to determine the strength, or power, of received signals relative to some baseline. For example, relevant power module 403 may receive uplink beams 130 from receiving unit 108 and measure the relevant power 439 of each uplink beam 130. The relevant power 439 of each uplink beam 130 may be based on the input power of that uplink beam 130 received at the corresponding beam receiver 112 and the current gain of that beam receiver 112, as described in greater detail below with reference to FIGS. 12 and 13.

Beam selection modules 404 are generally operable to select one or more appropriate beams for transmitting signals to or receiving signals from mobile stations 15 based on one or more inputs or parameters, such as information received from beam analysis modules 398, signaling information monitoring system 106, and storage module 406, for example. Beam selection modules 404 may be operable to determine receiving beam selections 126 and/or transmitting beam selections 124. In some embodiments, beam selection modules 404 include a fast decision beam selection module 408 and a smart decision beam selection module 410. In general, fast decision beam selection module 408 is operable to make relatively fast beam selection decisions substantially in real time. Smart decision beam selection module 410 is generally operable to make beam selection decisions based on further analysis of inputs and parameters. Beam selection modules 404 may also include a selected beam decision module, such as a fast/smart decision beam selection module 416 to determine whether to use the results of fast decision beam selection module 408 or smart decision beam selection module 410 in particular circumstances.

Storage module 406 is generally operable to store information received from beam analysis modules 398, beam selection modules 404, signaling information monitoring system 106, and/or any other component of smart antenna system 14. In some embodiments, storage module 406 is operable to store information from beam analysis modules 398 to be used by smart decision beam selection module 410.

In operation, uplink beams 130 received by receiving unit 108 are communicated to the corresponding processing module 62. Beam analysis modules 398 analyzes uplink beams 130 to determine one or more characteristics or parameters of each uplink beam 130. In some embodiments, correlation module 400 determines a correlation quality for each uplink beam 130 based on a correlation between the signal sequences communicated in each uplink beam 130 with one or more known training sequences. In one embodiment, correlation module 400 correlates each uplink beam 130 with each known training sequence to determine the correlation quality for that uplink beam 130. In another embodiment, correlation module 400 determines the correlation quality for each uplink beam 130 by correlating that uplink beam 130 with an appropriate one of the known training sequences, which is determined based on relevant signaling information 180 received from signaling information monitoring system 106. In addition, signal strength module 402 may determine a signal strength for each uplink beam 130.

Beam selection modules 404 may then determine receiving beam selections 126 and/or transmitting beam selections 124 based on one or more inputs. In one embodiment, these inputs include the current correlation quality and signal strength determined for each uplink beam 130 as well as previously determined correlation qualities and signal strengths stored in storage module 406. Fast decision beam selection module 408 and smart decision beam selection module 410 may determine a fast decision beam selection and a smart decision beam selection, respectively. The fast decision beam selection and the smart decision beam selection may be the same or different beams, depending on the circumstances. Fast/smart decision beam selection module 416 may determine whether to use the fast decision beam selection, the smart decision beam selection, or neither depending on the circumstances.

It should be understood that the embodiment shown in FIG. 11 focuses on the system and methods for selecting receiving beam selections 126 and transmitting beam selections 124 for one of the frequencies used by base station transceiver 24. Smart antenna system 14 may use similar or identical systems or methods to select receiving beam selections 126 and transmitting beam selections 124 for each of the other frequencies used by base station transceiver 24. It should also be understood that in some embodiments, more than one uplink beam 130 may be selected by beam selection modules 404 for receiving and/or transmitting signals. For example, in one embodiment, beam selection modules 404 are operable to select the two best uplink beams 130 to be communicated to base station transceiver 24. In addition, in some embodiments in which smart antenna system is an adaptive antenna system, beam selection modules 404 may be operable to select one or more uplink beams 130 and/or one or more downlink beams 132 such that beamforming network 128 may form an appropriately-shaped beam for receiving signals from and transmitting signals to mobile stations 15.

Figure 12:
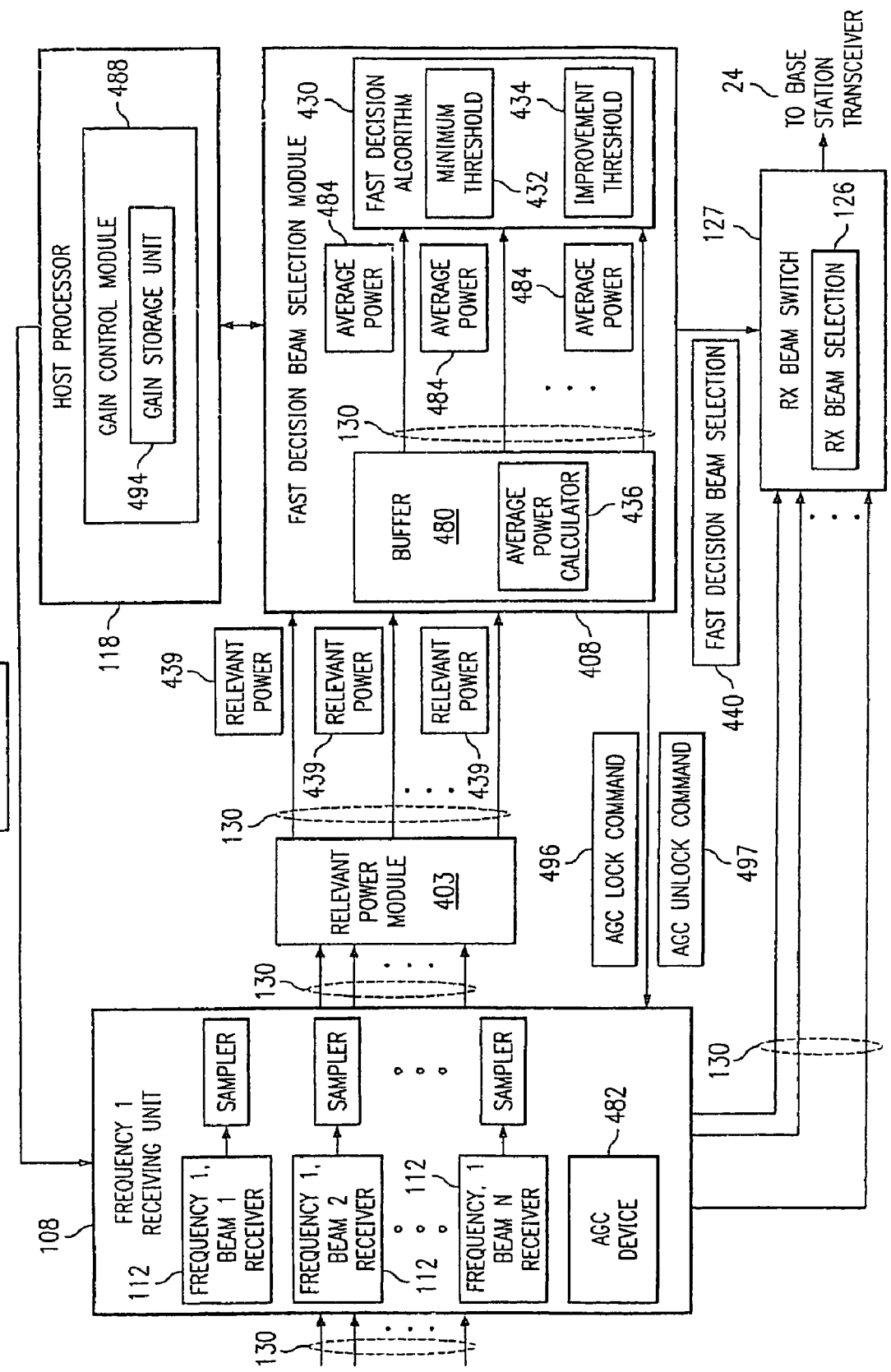
FIG. 12 illustrates a system for determining fast decision beam selections in accordance with an embodiment of the present invention.

FIGS. 12 through 15 illustrate a fast decision beam selection system and method in accordance with an embodiment of the present invention. In particular, FIG. 12 illustrates a system for determining fast beam selections 440 including a receiving unit 108 for a particular frequency, relevant power module 403, fast decision beam selection module 408, host processor 118, and receiving beam switch 127. As discussed above with reference to FIGS. 2 and 3, frequency receiving unit 108 associated with a particular frequency is operable to receive uplink beams 130 from antenna unit 18. Frequency receiving unit 108 may include a beam receiver 112 operable to receive each uplink beam 130. Uplink beams 130 received by frequency receiving unit 108 may be communicated along a first path to receiving beam switch 127 and along a second path to an appropriate processing module 62. Receiving beam switch 127 may allow one or more uplink beams 130 to pass through to base station transceiver 24 based on the current selected receiving beam selection 126. Processing module 62 is operable to determine a fast decision beam selection 440 that may be used as the current receiving beam selection 126, depending on the situation.

Frequency receiving unit 108 may include an AGC (Automatic Gain Control) device 482 operable to control the gain of each beam receiver 112. In operation, AGC device 482 may control the gain of each beam receiver 112 based on the strength of input signals received via each uplink beam 130 such that the output strength of each beam receiver 112 is the same or similar. However, AGC device 482 may be locked such that the gain of each beam receiver 112 is held constant, and thus the strength of the output of each beam receiver 112 may vary depending on the strength of the input signals being received via each uplink beam 130. AGC device 482 may be locked such that the gain of each beam receiver 112 is held at a constant value equal to a gain setting 490 determined by central processing unit 118. In one embodiment, AGC device 482 is turned off at the beginning of a fast decision time slot such that the signal strength of each uplink beam 130 may be measured and compared against each other and/or against a threshold value, as discussed below in greater detail.

Central processing unit 118 may comprise a gain control module 488 generally operable to determine gain settings 490 for each beam receiver 112 based on one or more inputs. Gain control module 488 may comprise a gain storage unit 494 generally operable to store gain values for each beam receiver 112. Gain storage unit 494 is operable to receive and store gains values determined by AGC device 482 during operation of AGC device 482. Gain control module 488 is operable to determine a gain setting 490 for each beam receiver 112, as described in greater detail below with reference to FIGS. 14 and 15. The gain settings 490 for each beam receiver 112 are communicated to receiving system 100 and used to set the gain of each beam receiver 112 for the beginning of a particular time slot in which AGC device 482 is turned off.

As shown in the embodiment of FIG. 12, processing module 62 comprises fast decision beam selection module 408 and signal strength module 402. Fast decision beam selection module 408 comprises a filter, or buffer, 480 and one or more fast decision algorithms 430. Buffer 480 and fast decision algorithms 430 are generally operable to determine fast decision beam selections 440 based at least in part on inputs received from signal strength module 402. Buffer 480 may include an average power calculator 436 operable to determine average signal strengths based on a plurality of samples within buffer 480. Fast decision algorithms 430 may include a minimum threshold 432 and an improvement threshold 434, discussed in greater detail below.

As discussed above with reference to FIG. 11, relevant power module 403 may be operable to receive uplink beams 130 from receiving system 100 and measure the relevant power 439 of each uplink beam 130. The relevant power 439 of each uplink beam 130 may be based on the input power of that uplink beam 130 received at the corresponding beam receiver 112 and the current gain of that beam receiver 112.

For example, if the input power of an uplink beam 130 received at a beam receiver 112 is 5 dB and the current gain of that beam receiver 112 is −2 dB, the relevant power 439 of that uplink beam 130 is 3 dB.

Relevant power module 403 may be operable to repetitively sample the relevant power 439 of each uplink beam 130. In a particular embodiment, relevant power module 403 is operable to sample the relevant power 439 for each uplink beam 130 at the approximate rate of seven times per GSM bit. In another embodiment, relevant power module 403 is operable to sample the relevant power 439 for each uplink beam 130 approximately 24 times every GSM bit.

Fast decision beam selection module 408 is operable to receive the sampled relevant power 439 of each uplink beam 130 from relevant power module 403. Buffer 480 is operable to receive each sample of the relevant power 439 of each uplink beam 130. Buffer 480 includes an average power calculator 436 operable to determine an average power 484 of each uplink beam 130 over a particular period of time or based on a particular number of samples of the relevant power 439 that uplink beam 130 within buffer 480. For example, in one embodiment, average power calculator 436 may be operable to determine the average power 484 of each uplink beam 130 based on the six most recent samples received from relevant power module 403. In addition, average power calculator 436 may be operable to update the average power 484 of each uplink beam 130 after each new sample or after some number of new samples received from relevant power module 403. Thus, the average power 484 of each uplink beam 130 may be dynamic. In a particular embodiment, average power calculator 436 calculates or updates the average power 484 of each uplink beam 130 after every new sampling of relevant power 439 by relevant power module 403.

Fast decision algorithm 430 is operable to determine the strongest uplink beam 130 (in other words, the uplink beam 130 with the highest average power 484) and to determine whether the average power 484 of the strongest uplink beam 130 is greater than minimum threshold 432. Minimum threshold 432 may be any appropriate value expressed in decibels or volts. For example, in one embodiment, minimum threshold 432 is approximately 9 dB. In another embodiment, minimum threshold 432 is approximately 4 dB.

In one embodiment, if the average power 484 of the strongest uplink beam 130 is greater than minimum threshold 432, fast decision beam selection module 408 may select that uplink beam 130 as the fast decision beam selection 440. In that embodiment, if the average power 484 of the strongest uplink beam 130 is less than minimum threshold 432, fast decision beam selection module 408 may select none of the uplink beams 130 as the fast decision beam selection 440. In another embodiment, if the average power 484 of the strongest uplink beam 130 is less than minimum threshold 432, fast decision beam selection module 408 maintains the most recently selected fast decision beam selection 440.

Fast decision algorithm 430 may continue to analyze the dynamic average power 484 of each uplink beam 130 even after an uplink beam 130 has been selected as fast decision beam selection 440. This may be done to identify one or more other uplink beams 130 that may become stronger than the current fast decision beam selection 440 as average power calculator 436 continues to sample signal strengths 438 from signal strength module 402. For example, suppose a relatively weak burst from a first mobile station 15 is identified in a first uplink beam and that beam is selected as fast decision beam selection 440 in the beginning of a time slot. Fast decision algorithm 430 may continue to search for a stronger burst from a second mobile station 15 arriving at smart antenna apparatus 16 via a second uplink beam later in the time slot. If the burst identified in the second beam station is sufficiently stronger than the burst identified in the first beam, fast decision beam selection module 408 may switch fast decision beam selection 440 from the first beam to the second beam.

As buffer 480 continues to update the average power 484 of each uplink beam 130, fast decision algorithm 430 may determine whether the average power 484 of the current strongest uplink beam 130 exceeds that of the current fast decision beam selection 440 by an amount greater than improvement threshold 434. If fast decision algorithm 430 determines that current strongest uplink beam 130 does exceed that of the current fast decision beam selection 440 by an amount greater than improvement threshold 434, fast decision beam selection module 408 may switch fast decision beam selection 440 to the current strongest uplink beam 130. If fast decision algorithm 430 determines that current strongest uplink beam 130 does not exceed that of the current fast decision beam selection 440 by an amount greater than improvement threshold 434, fast decision beam selection module 408 may maintain the most recently selected fast decision beam selection 440.

Fast decision algorithm 430 may continue to determine whether the average power 484 of the current strongest uplink beam 130 exceeds that of the currently current fast decision beam selection 440 by an amount greater than the improvement threshold 434, and fast decision beam selection module 408 may continue to switch the selected fast decision beam selection 440 accordingly. In some embodiments, fast decision beam selection module 408 continues switching or updating fast decision beam selection 440 as described above until a certain time is reached. For example, in a GSM environment, fast decision beam selection module 408 may continue switching fast decision beam selection 440 until the last point in the time slot in which a random access channel (RACH) signal could be received by smart antenna apparatus 16. In particular, fast decision beam selection module 408 continues switching fast decision beam selection 440 until the approximate middle of the time slot is reached. In one embodiment, fast decision beam selection module 408 continues switching until the 61st GSM bit in the time slot is reached.

In another embodiment, fast decision beam selection module 408 continues switching or updating fast decision beam selection 440 as described above until the same uplink beam 130 remains the selected uplink beam 130 for a defined time period. When the same uplink beam 130 remains selected as fast decision beam selection 440 for a defined time period, that uplink beam 130 may be locked in and fast decision beam selection module 408 may refuse to switch to any other uplink beam 130, regardless of whether the average power 484 of the current strongest uplink beam 130 exceeds the locked-in uplink beam 130 by the improvement threshold 434. For example, in one embodiment, fast decision beam selection module 408 continues switching fast decision beam selection 440 until the same uplink beam 130 is selected as fast decision beam selection 440 for a period of time equal to approximately three GSM bits. In this embodiment, when the same uplink beam 130 remains the fast decision beam selection 440 for approximately three GSM bits, that uplink beam 130 is locked in and fast decision beam selection module 408 will not switch to any other uplink beam 130.

Fast decision beam selection module 408 may be operable to determine, or switch, fast decision beam selection 440 substantially in real time. For example, average power calculator 436 may determine the average power 484 of each uplink beam 130 during based on signals received via each uplink beam 130 in a first portion of a first time slot of a first frame. Fast decision algorithm 430 may then select the uplink beam 130 based at least in part on the average power 484 of each uplink beam 130. Receiving beam switch 127 may then switch to the selected uplink beam 130 such that signals received via the selected uplink beam 130 in a second portion of the first time slot of the first frame may be communicated to the base station transceiver in real time.

In some embodiments, fast decision beam selection module 408 is operable to determine, or switch, fast decision beam selection 440 to the appropriate uplink beam 130 each time average power calculator 436 calculates or updates the average power 484 of each uplink beam 130. To provide further illustration, suppose mobile station 15 communicates a RACH burst, such as a call initiation request or an access request, which is received by processing system 102 via a particular uplink beam 130. Fast decision beam selection module 408 may identify the RACH burst and select the uplink beam 130 as fast decision beam selection 440 before the end of the pre-message, tail, or guard portion of the burst. In one embodiment in a GSM environment, beam selection module 408 is operable to select fast decision beam selection 440 during the 3 GSM bit tail portion at the beginning of a burst.

Fast decision beam selection module 408 may be used in variety of circumstances. For example, beam selection decisions made by fast decision beam selection module 408 may be used during the initiation of a call by a mobile station 15 or in some situations in which the location of a mobile station 15 is unknown by smart antenna system 14. In particular, fast decision beam selection module 408 may be used to make beam selection determinations regarding a communication initiation signal, such as a random access channel (RACH) signal, received from a mobile station 15, as described above. In addition, in some embodiments, beam selection determinations made by fast decision beam selection module 408 are used initially after mobile station 15 has switched to a particular traffic channel according to base station control signals.

Fast decision beam selection module 408 provides the ability to switch beams in real time for communications about which smart antenna apparatus 16 has little or no previous information. In particular, fast decision beam selection module 408 may be operable to select and switch beams for call initiation signals received from mobile stations 15. Thus, since beam selection generally decreases interference and increases the coverage or range of an antenna system, smart antenna system 14 has a increased range for identifying initial signals, such as access requests or call initiation signals, from mobile stations 15 as compared with traditional sector antennas or antennas that use beam selection techniques only after a call has been established.

Figure 13:
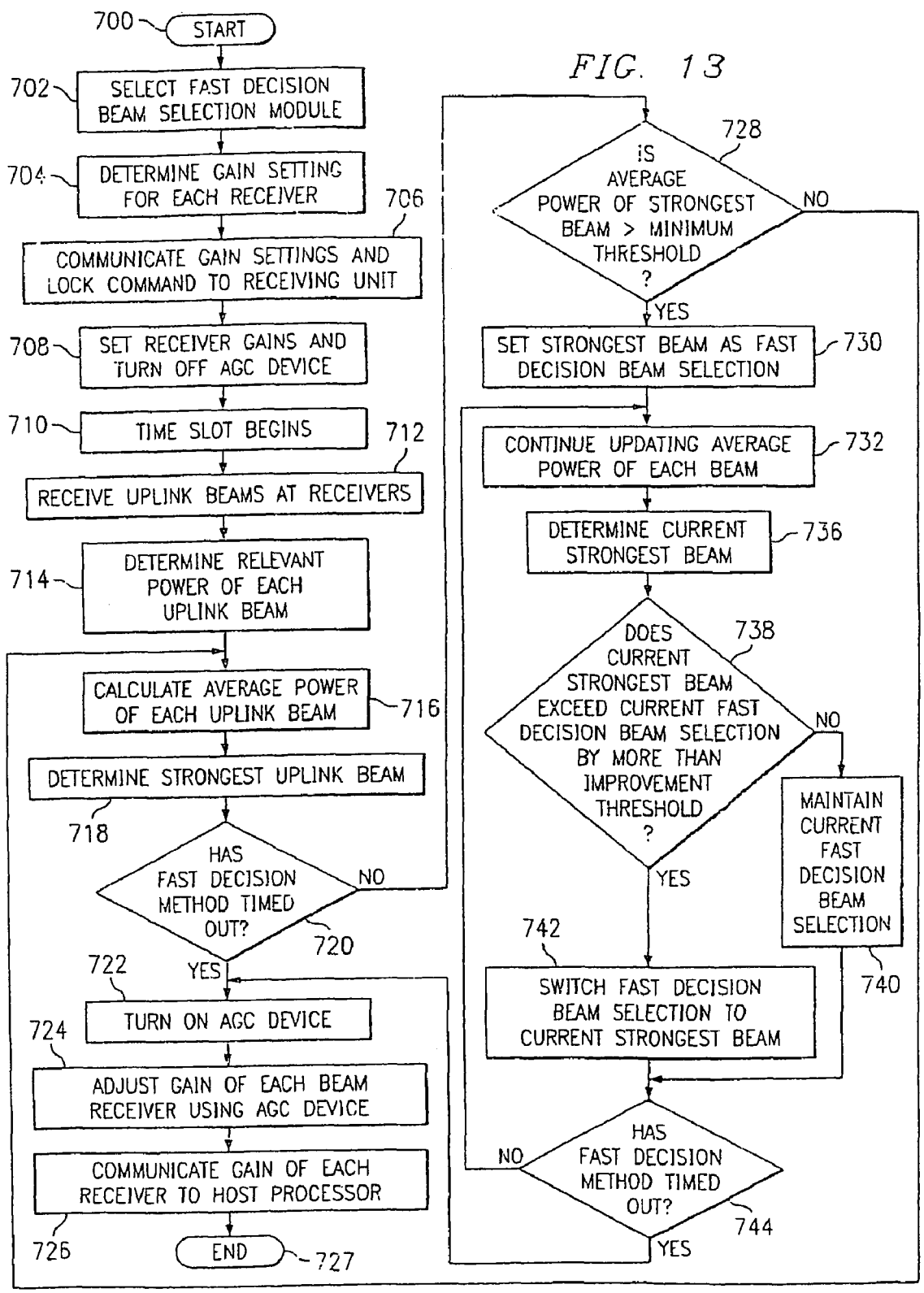
FIG. 13 illustrates a method for determining fast decision beam selections in accordance with an embodiment of the present invention.

FIG. 13 illustrates a method of fast decision beam selection in accordance with an embodiment of the present invention. The method starts at step 700. In one embodiment, the method starts before a particular time slot. In a particular embodiment, the method starts before a random access channel (RACH) time slot. At step 702, processing module 62 determines that fast decision beam selection module 408 will be used to determine receiving beam selections 126 during the particular time slot. At step 704, central processing unit 118 determines a gain setting 490 for each beam receiver 112 based on one or more input parameters, as discussed in greater detail below with reference to FIGS. 14 and 15. At step 706, gain settings 490 and an AGC lock command 496 are communicated to receiver unit 108 from central processing unit 118 and processing module 62, respectively. At step 708, the gain of each beam receiver 112 is set according to gain settings 490 received from processing module 62 and AGC device 482 is turned off, locking the gain of each beam receiver 112.

At step 710, the particular time slot begins. At step 712, uplink beams 130 are received from antenna unit 18 by beam receivers 112. At step 714, the relevant power 439 of each uplink beam 130 is determined by relevant power module 403 and communicated to buffer 480. At step 716, buffer 480 calculates the average power 484 of each uplink beam 130 based on a particular number of samples of the relevant power 439 of each uplink beam 130, including the sample determined at step 714 (in other words, the current sample). Step 716 may be repeated after every one or more samples of relevant power 439 are determined at step 714.

At step 718, the strongest uplink beam 130 is determined by comparing the average power 439 of each uplink beam 130. At step 720, it is determined whether the fast decision method has timed out. In particular, the fast decision method may time out after a particular point in the time slot is reached. In one embodiment in a GSM environment, the fast decision method times out after the 61st bit from the beginning of the time slot is reached. If it is determined at step 720 that the fast decision method has timed out, the method proceeds to step 722. At step 722, processing module 62 communicates an AGC unlock command 497 to receiving unit 108 which turns AGC device 482 back on. At step 724, AGC device 482 controls or adjusts, if necessary, the gain of each beam receiver 112 based on the input power of uplink beams 130 received by each beam receiver 112. At step 726, the magnitude of the gain of each beam receiver 112 at the end of the time slot, as adjusted by AGC device 482, is communicated to central processing unit 118 for use in determining gain settings 90 for subsequent time slots, as discussed below with reference to FIGS. 14 and 15. At step 727, the method ends.

If it is determined at step 720 that the fast decision method has not timed out, the method proceeds to step 728. At step 728, it is determined whether the average power 439 of the strongest uplink beam 130 is greater than a defined signal power threshold, such as minimum threshold 432. In one embodiment, this determination is made by fast decision algorithm 430. If it is determined that the average power 439 of the strongest uplink beam 130 is greater than minimum threshold 432, that uplink beam 130 is set as the fast decision beam selection 440 at step 730. If not, the method returns to step 716 to continue calculating and sampling the average power 439 of each uplink beam 130.

At step 732, fast decision algorithm 430 continues to update the average power 484 of each uplink beam 130 based on samples received from relevant power module 403. At step 736, the current strongest uplink beam 130 is determined based on the updated average power 484 of each uplink beam 130. At step 738, it is determined whether the average power 484 of the current strongest uplink beam 130 exceeds that of the uplink beam 130 currently selected as fast decision beam selection 440 by more than the improvement threshold 434. In one embodiment, improvement threshold 434 is the same as minimum threshold 432. In another embodiment, improvement threshold 434 is greater than minimum threshold 432. In yet another embodiment, improvement threshold 434 is less than minimum threshold 432. If it is determined at step 738 that the current strongest uplink beam 130 does exceed the currently selected fast decision beam selection 440 by more than the improvement threshold 434, fast decision beam selection 440 is switched to the current strongest uplink beam 130 at step 740, and the method proceeds to step 744. If not, the current fast decision beam selection 440 is maintained at step 742.

At step 744, it is determined whether the fast decision method has timed out. Step 744 may be similar or identical to step 720. If it is determined at step 742 that fast decision method has timed out, steps 722 through 727 may be performed. If it is determined at step 742 that fast decision method has not timed out, the method may return to step 732.

Figure 14:
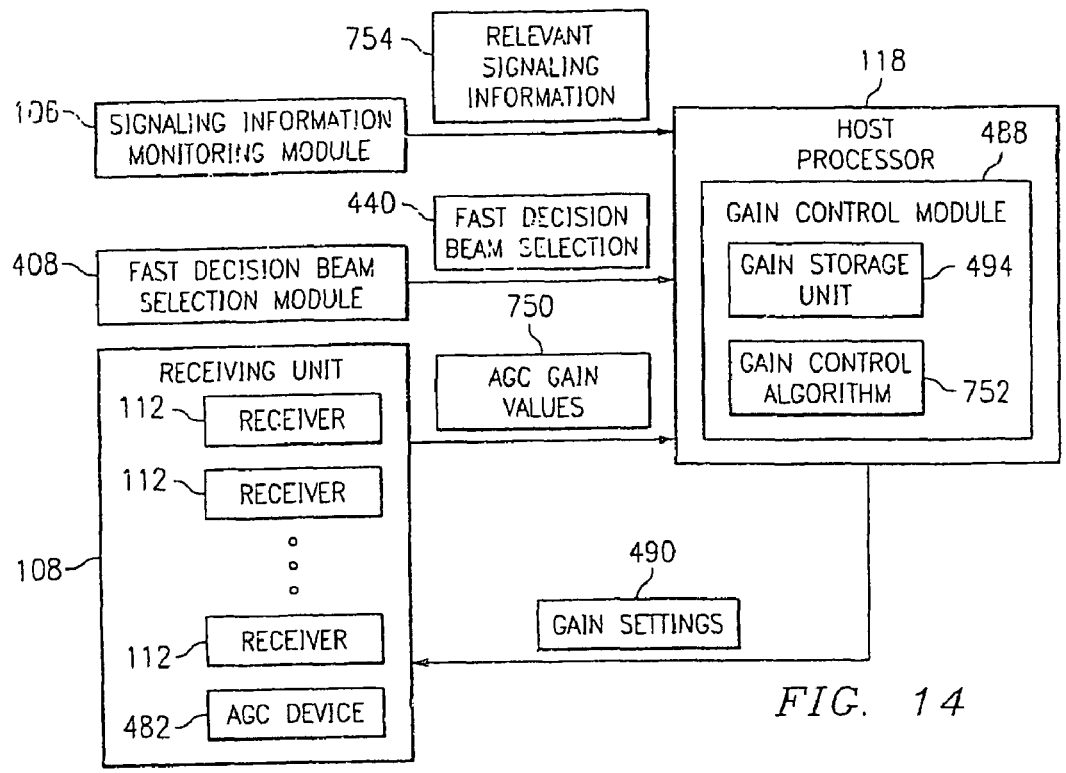
FIG. 14 illustrates a system for controlling the gain settings for each beam receiver for determining fast decision beam selections in accordance with an embodiment of the present invention.
Figure 15:
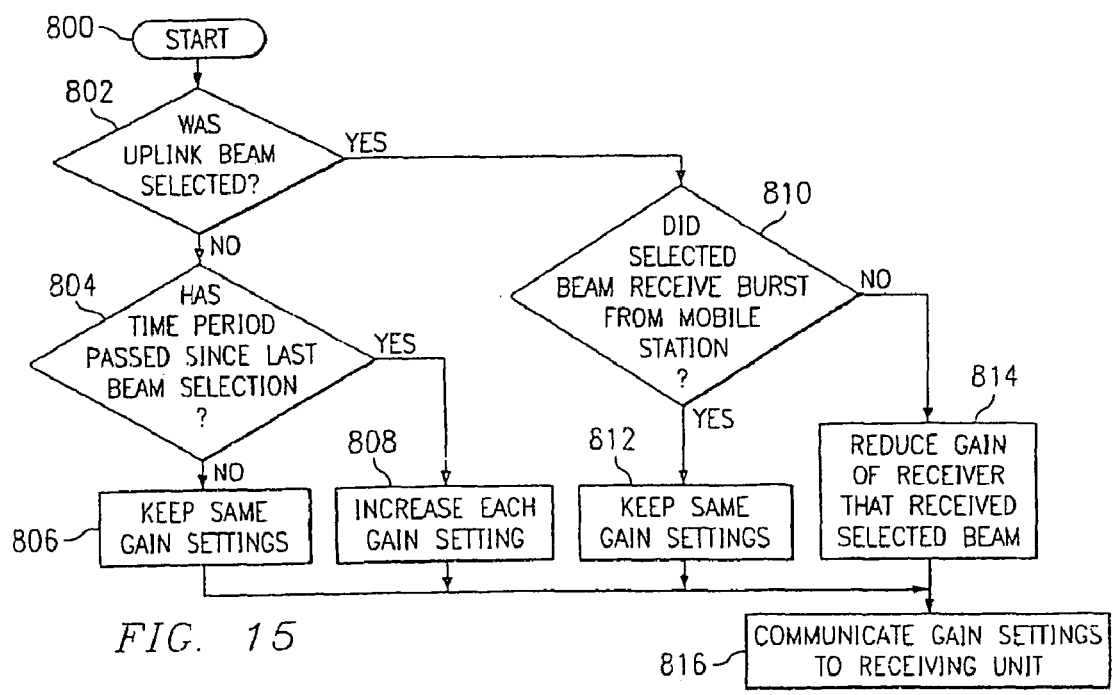
FIG. 15 illustrates a method for controlling the gain settings for each beam receiver for determining fast decision beam selections in accordance with an embodiment of the present invention.

FIGS. 14 and 15 illustrate a system and method for determining gain settings 490 for use in determining fast decision beam selections 440 in accordance with an embodiment of the present invention. As shown in FIG. 14, host processor 118 includes gain control module 488 that may include gain storage unit 494. Gain control module 488 is generally operable to determine gain settings 490 for use in receiving unit 108 based on one or more inputs. In one embodiment, these inputs include relevant signaling information 754 received from signaling information monitoring module 106, AGC gain values 750 determined by AGC device 482, whether or not fast decision beam selection module 408 selected a fast decision beam selection 440, and the current fast decision beam selection 440. Gain storage unit 494 is operable to receive and store AGC gain values 750. Gain control module 488 may be operable to execute a gain control algorithm 752 to determine gain settings 490. Gain control algorithm 752 is described in greater detail below with reference to FIG. 15.

Generally, gain control module 488 is operable to determine gain settings 490 for each beam receiver 112 for the beginning of the next time slot (or for a particular time slot in the future) by selecting a baseline value for the gain of each beam receiver 112 and adjusting none, one, several or all of the baseline values. In one embodiment, the AGC gain values 750 determined during the past time slot (in other words, during the portion of the past time slot in which AGC device 482 was operating) are used as the baseline values for the gain of each beam receiver 112. In another embodiment, the gain settings 490 determined by gain control module 488 for the beginning of the past time slot are used as the baseline values for the gain of each beam receiver 112.

To determine gain settings 490, gain control module 488 may first determine whether fast decision beam selection module 408 selected a fast decision beam selection 440 (in other words, whether the strongest uplink beam 130 was greater than minimum threshold 432) during the past time slot. If fast decision beam selection module 408 did select a fast decision beam selection 440 during the past time slot, gain control module 488 may determine from relevant signaling information 754 whether a burst from a mobile station 15 was received in that time slot, or whether the selected uplink beam 130 was receiving noise from some other source. In one embodiment, if relevant signaling information 754 indicates that there was a mobile station 15 communicating in that the slot, gain control module 488 sets gain settings 490 equal to the baseline values for each beam receiver 112. On the other hand, if relevant signaling information 754 indicates that there was not a mobile station 15 communicating in that time slot, then the selected uplink beam 130 was selected erroneously, and gain control module 488 may set gain settings 490 equal to the baseline values for each beam receiver 112 except, but decrease the gain setting 490 for the beam receiver 112 that received the selected uplink beam 130.

If fast decision beam selection module 408 does not select a fast decision beam selection 440 for a particular period of time, such as over a span of a particular number of time slots, gain control module 488 may increase the gain setting 490 of each beam receiver 112 by a particular amount above the baseline values to increase the sensitivity of beam receivers 112.

FIG. 15 illustrates a method for determining gain settings 490 in accordance with an embodiment of the present invention. In particular, FIG. 15 may illustrate gain control algorithm 752 operable to be executed by gain control module 488. At step 800, the method starts. In one embodiment, the method may start after a particular time slot. At step 802, it is determined whether an uplink beam 130 was selected as fast decision beam selection 440 during the particular time slot. In other words, it is determined whether any uplink beam 130 was determined to be greater than minimum threshold 432 during the particular time slot. If it is determined at step 802 that an uplink beam 130 was selected during the particular time slot, the method proceeds to step 810. However, if it is determined at step 802 that an uplink beam 130 was not selected during the particular time slot, the method proceeds to step 804. At step 804, it is determined whether a particular time period or a particular number of time slots have passed since any uplink beam 130 was last selected. If it is determined at step 804 that the particular time period or number of time slots have not passed since any uplink beam 130 was last selected, gain control module 488 may set the gain settings 490 equal to the baseline level for each beam receiver 112 at step 806. On the other hand, if it is determined at step 804 that the particular time period or number of time slots have passed since any uplink beam 130 was last selected, gain control module 488 may increase the baseline level for each beam receiver 112 at step 808 and set these increased gains as gain settings 490.

At step 810, it is determined whether the selected uplink beam 130 received a burst from a mobile station 15 or noise from some other source. In particular, gain control module 488 may analyze relevant signaling information 754 that includes information about the signals received during the particular time slot to determine whether a burst from a mobile station 15 was identified in that time slot. If it is determined at step 810 that the selected uplink beam 130 received a burst from a mobile station 15, gain control module 488 may set the gain settings 490 equal to the baseline level for each beam receiver 112 at step 812. On the other hand, if it is determined at step 810 that the selected uplink beam 130 did not receive a burst from a mobile station 15 (rather, that selected uplink beam 130 received a burst of noise from some other source), gain control module 488 may set the gain settings 490 equal to the baseline level for each beam receiver 112, except reducing the gain of the beam receiver 112 that received the selected uplink beam 130, at step 814.

At step 816, the gain settings 490 determined at step 806, 808, 812 or 814 are communicated from host processor 118 to receiving unit 108. These gain settings 490 are then used to set the gain of each beam receiver 112 before or at the beginning of the next time slot. This process may be repeated to determine or update the gain settings 490 of each beam receiver 112 for determining fast decision beam selections 440.

Figure 16:
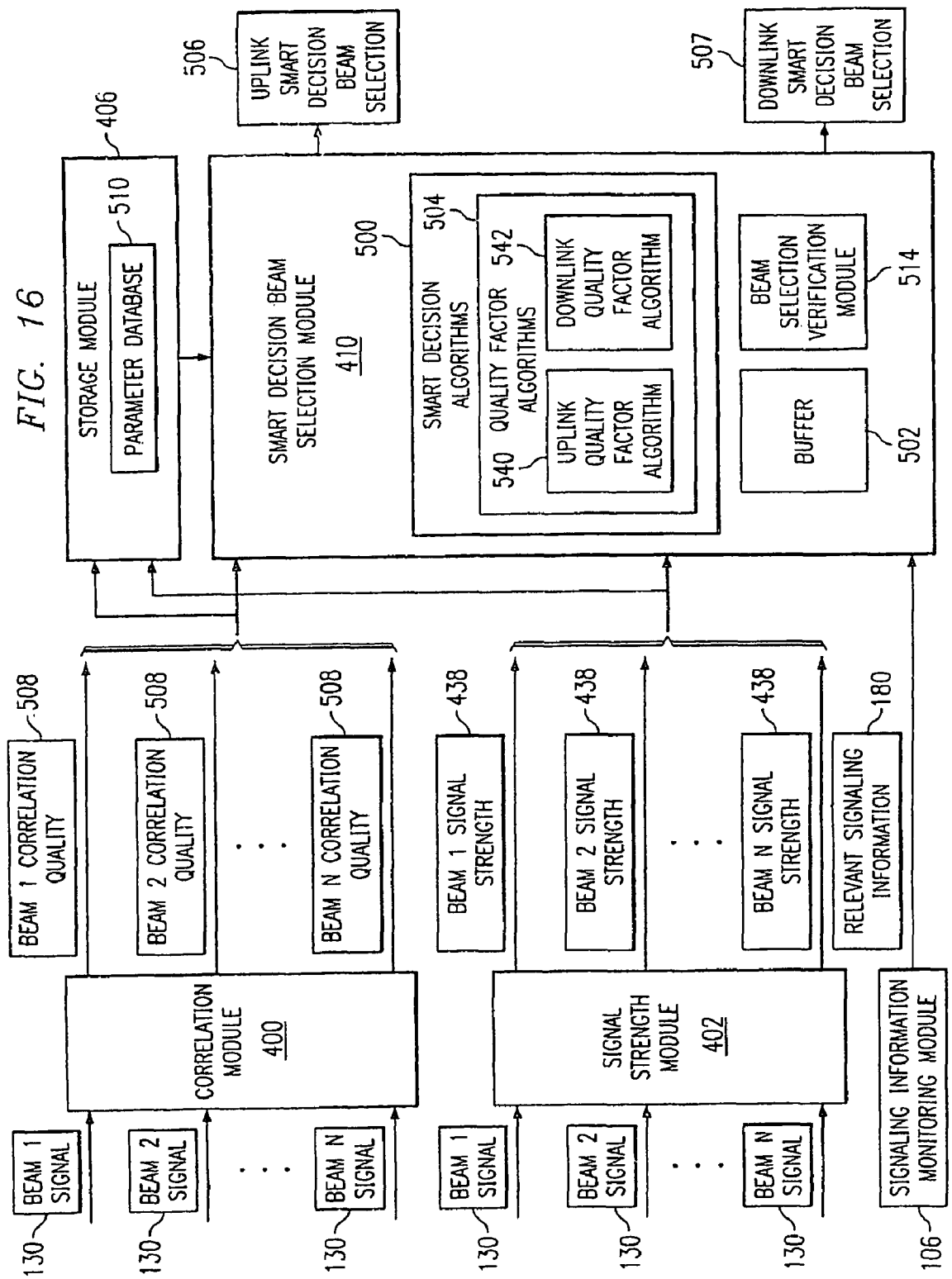
FIG. 16 illustrates a system for determining smart decision beam selections including a smart decision beam selection module in accordance with an embodiment of the present invention.
Figure 17:
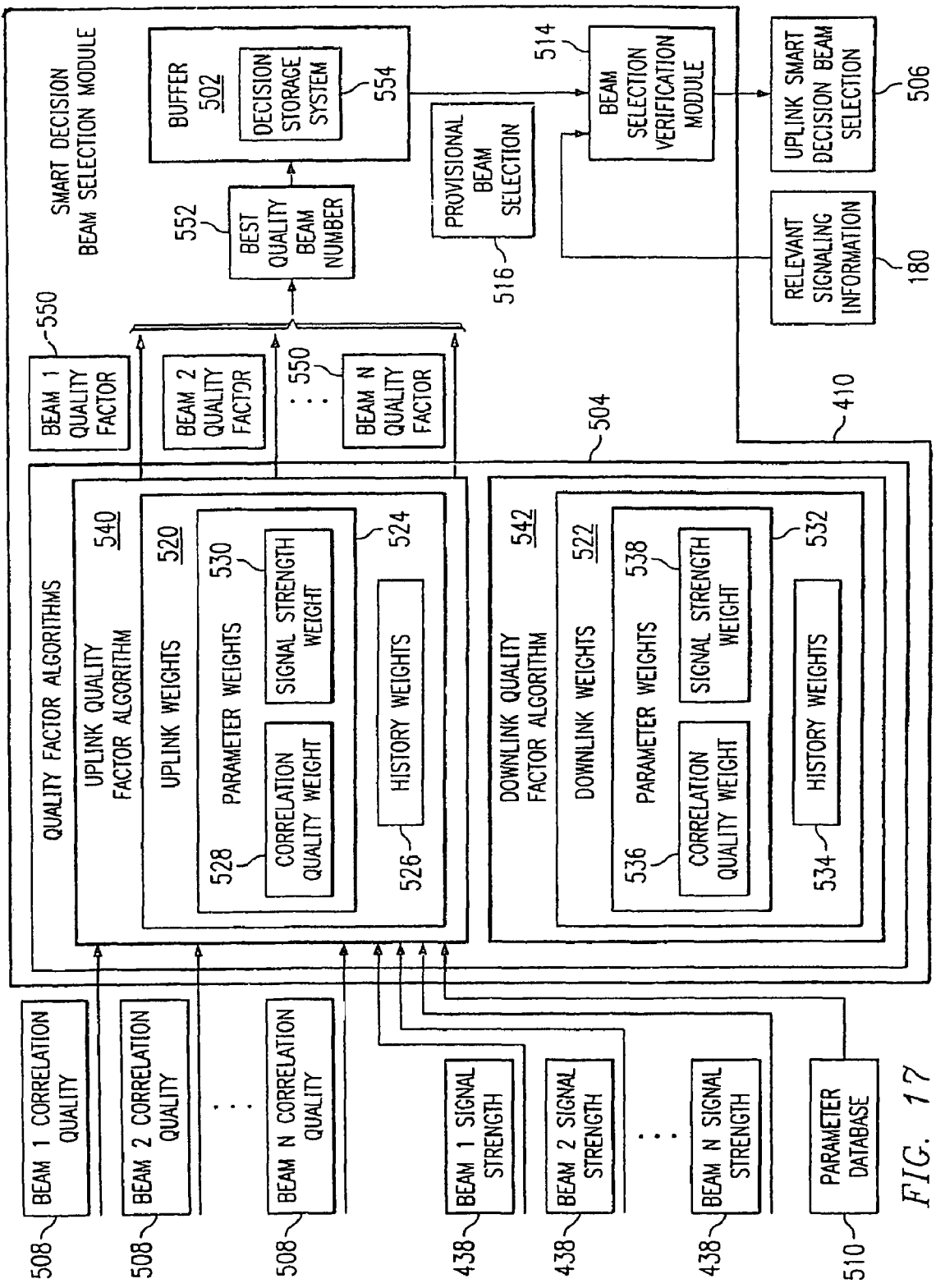
FIG. 17 illustrates the architecture and operation of the smart decision beam selection module of FIG. 16 in accordance with an embodiment of the present invention.
Figure 18:
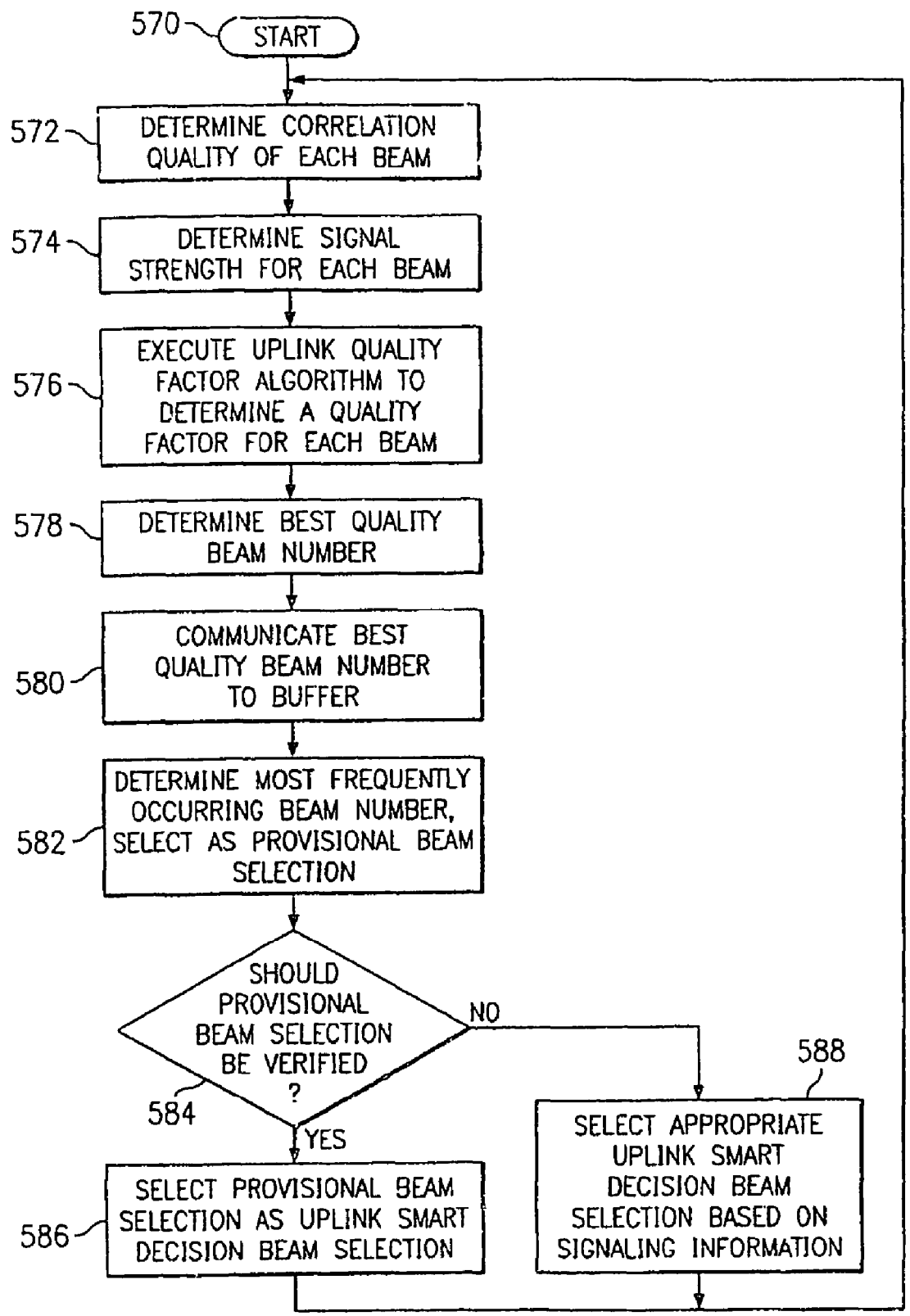
FIG. 18 illustrates a method for determining smart decision beam selections in accordance with an embodiment of the present invention.

FIGS. 16 through 18 illustrate a smart decision beam selection system and method in accordance with an embodiment of the present invention. As shown in the embodiment of FIG. 16, a smart decision beam selection module 410 comprises one or more smart decision algorithms 500, a buffer 502, and a beam selection verification module 514. In one embodiment, smart decision algorithms 500 include a quality factor algorithm 504 operable to determine a quality factor for one or more beams based on one or more inputs or parameters, including information from correlation module 400, signal strength module 402, storage module 406 and/or any other suitable source of information. Buffer 502 is generally operable to receive and store quality factor selections made by quality factor algorithm 504, and to determine a provisional beam selection 512 based on the received and stored quality factor selections. Beam selection verification module 514 is generally operable to determine whether to verify provisional beam selection 512 based on relevant signaling information 180 received from signaling information monitoring system 106. If provisional beam selection 512 is verified by beam selection verification module 514, the provisional beam selection 512 is selected as the smart decision beam selection 506.

As discussed above with reference to FIG. 11, correlation module 400 may be operable to correlate signal sequences received via one or more uplink beams 130 with one or more known training sequences in order to determine a correlation quality 508 for each of the beams. As discussed above with reference to FIG. 12, signal strength module 402 may be operable to determine a signal strength 438 associated with each uplink beam 130. In one embodiment, signal strength module 402 is operable to determine the RSSI for each uplink beam 130.

Correlation qualities 508 and signal strengths 438 of each uplink beam 130 may be communicated to smart decision beam selection module 410, as well as to storage module 406. Storage module 406 includes a parameter database 510 operable to store data regarding one or more inputs or parameters, such as correlation qualities 508 and signal strengths 438, for example. Storage module 406 may be operable to supply smart decision beam selection module 410 with data from parameter database 510 for use in determining smart decision beam selections 506.

In operation, quality factor algorithm 504 may be operable to receive correlation qualities 508 and signal strengths 438 from correlation module 400 and signal strength module 402, respectively, in real time, as well as stored data from parameter database 510, in order to determine a quality factor for each uplink beam 130. Buffer 502 may receive one or more of the quality factors and determine provisional beam selection 512. Beam selection verification module 514 may then determine whether to verify provisional beam selection 512 based on relevant signaling information 180. If provisional beam selection 512 is verified, it may be selected as the smart decision beam selection 506. This system is discussed in greater detail below with reference to FIG. 17.

FIG. 17 illustrates relevant details and operation of smart decision selection module 410 in accordance with one embodiment of the present invention. As discussed above, smart decision selection module 410 may include quality factor algorithm 504, buffer 502, and beam selection verification module 514. Quality factor algorithm 504 may include uplink weights 520 and downlink weights 522. Uplink weights 520 may include uplink parameter weights 524 and uplink history weights 526. Uplink parameter weights 524 may include uplink correlation quality weight 528 and uplink signal strength weight 530. Similarly downlink weights 522 may include downlink parameter weights 532 and downlink history weights 534. Downlink parameter weights 532 may include downlink correlation quality weight 536 and downlink signal strength weight 538.

In general, uplink weights 520 are used by uplink quality factor algorithm 520 to determine uplink quality factors 550 corresponding to each uplink beam 130 based on one or more inputs or parameters. In particular, parameter weights 524 are used to weight the significance of each parameter used in determining uplink quality factors 550. Uplink correlation quality weight 528 and uplink signal strength weight 530 are used to weight the significance of the correlation quality and signal strength, respectively, of each uplink beam 130 in determining uplink quality factors 550. History weights 526 are used to weight the significance of each or one or more samples of the parameters. In some embodiments, history weights 526 are used to weight particular determinations, such as the correlation quality and signal strength of each uplink beam 130, based on the time slot or frame in which the determinations were made.

Similarly, downlink weights 522 may be used by downlink quality factor algorithm 520 to determine downlink quality factors corresponding to each uplink beam 130. It should be noted that although FIG. 17 focuses on the determination of uplink smart decision beam selection 506, downlink smart decision beam selection 507 may be determined in a similar manner. However, in some embodiments, one or more downlink weights 522 are different from their corresponding uplink weights 526, and thus the resulting downlink smart decision beam selection 507 may be different than the uplink smart decision beam selection 506 determined based on the same inputs or parameters.

The following discussion relates to the operation of smart decision beam selection module 410 in determining uplink smart decision beam selection 506. Uplink quality factor algorithm 540 may determine an uplink quality factor 550 for each uplink beam 130 based on one or more inputs, including correlation qualities 508 and signal strengths 438 for each uplink beam 130. In particular, uplink quality factor algorithm 540 may receive correlation qualities 508 and signal strengths 438 determined based on a current or most recent time slot of each uplink beam 130, which may be referred to as time slot "t." Uplink quality factor algorithm 540 may also base its determination of each uplink quality factor 550 on information from parameter database 510, including correlation qualities 508 and signal strengths 438 determined based on one or more prior time slots of each uplink beam 130, which may be referred to as time slots "t-1," "t-2," and so on.

In one embodiment, uplink quality factor algorithm 540 determines the uplink quality factor ("QF") 550 for each uplink beam 130 using the following equation:

$$QF(i) = a1 * \{b1 * \text{Corr\_Quality}(i, t) + b2 * \text{Corr\_Quality}(i, t-1) + \quad (14)$$
$$b3 * \text{Corr\_Quality}(i, t-2) + b4 * \text{Corr\_Quality}(i, t-3) +$$
$$\ldots + bn * \text{Corr\_Quality}(i, t-n-1)\} +$$
$$a2 * \{c1 * \text{Sig\_Strength}(i, t) + c2 * \text{Sig\_Strength}(i, t-1) + + c3 *$$
$$\text{Sig\_Strength}(i, t-2) + c4 * \text{Sig\_Strength}(i, t-3) +$$
$$\ldots + ck * \text{Sig\_Strength}(i, t-k-1)\}$$

where:

"i" indicates the beam number,

"t" indicates the time,

Corr_Quality indicates the correlation quality of the beam,

Sig_Strength indicates the signal strength of the beam, and a1+a2+ . . . =b1+b2+b3+b4+ . . . +bn=c1+c2+c3+c4+ . . . +ck=1

Smart decision beam selection module 410 may be operable to select the number of the beam having the highest uplink quality factor 550, shown in FIG. 17 as best quality beam number 552. In some embodiments, uplink quality factor algorithm 540 is operable to determine a quality factor 550 for each uplink beam 130, as well as a best quality beam number 552, in each time slot in each frame.

The best quality beam number 552 may be received by buffer 502, which may include a decision storage system 554 operable to store one or more previously determined best quality beam numbers 552. In some embodiments, decision storage system 554 may be operable to store one or more previously determined best quality beam numbers 552 for each time slot, or traffic channel, in the relevant frequency. Buffer 502 may be operable to select a provisional beam selection 516 based on the received best quality beam number 552 as well as the previously determined best quality beam numbers 552 stored in decision storage system 554. In one embodiment, decision storage system 554 maintains a set of best quality beam numbers 552 for each traffic channel and determines provisional beam selection 516 based on the beam number occurring most frequently in the set of best quality beam numbers 552.

In addition, buffer 502 may determine whether to select a provisional beam selection 516 based on whether the quality factor 550 of best quality beam number 552 is sufficient. For example, buffer 502 may determine whether to select a provisional beam selection 516 based on whether the quality factor 550 of best quality beam number 552 meets a particular threshold value. In one embodiment, buffer 502 determines whether to select a provisional beam selection 516 based on whether the quality factor 550 of best quality beam number 552 exceeds that of the next best uplink beam 130 by a particular threshold value.

Beam selection verification module 516 may be operable to determine whether to verify the provisional beam selection 516 selected by buffer 502, and to select uplink smart decision beam selection 506 accordingly. In particular, beam selection verification module 516 may determine whether to verify the provisional beam selection 516 based on relevant signaling information 180 received from signaling information monitoring system 106, such as information regarding a new call beginning or an existing call ending, or information regarding frequency hopping. For example, relevant signaling information 180 may comprise frequency hopping information identifying one or more frequencies at which one or more mobile stations 15 are expected to receive traffic signals in particular frames or time slots. Beam selection verification module 516 may use frequency hopping information in conjunction with the provisional beam selection 516 selected by buffer 502 to select the appropriate uplink smart decision beam selection 506 for each frequency.

FIG. 18 illustrates a method of determining uplink smart decision beam selection 506 in accordance with an embodiment of the present invention. The method starts at step 570. At step 572, a correlation quality 508 is determined for each uplink beam 130. In particular, each correlation quality 508 may be determined by correlation module 400, as described in greater detail below with reference to FIGS. 19 and 20. At step 574, a signal strength 438 is determined for each uplink beam 130. In particular, each signal strength 438 may be determined by signal strength module 402. In addition, an average signal strength 438 may be determined for each uplink beam 130, such as discussed above with reference to FIG. 12.

At step 576, smart decision beam selection module executes uplink quality factor algorithm 540 based on one or more inputs to determine a quality factor 550 for each uplink beam 130. In particular, uplink quality factor algorithm 540 may use one or more uplink weights 520 to weight the significance of each input, such as discussed above with reference to FIG. 17. At step 578, the beam number of the beam having highest quality factor 550 is determined as best quality beam number 552.

Best quality beam number 552 is communicated to buffer 502 at step 580. Buffer 502 determines an appropriate provisional beam selection 516 based on the best quality beam number 552 received at step 580, as well as previously received best quality beam numbers that are stored in decision storage system 554. In one embodiment, buffer 502 determines provisional beam selection 516 by selecting the most frequently occurring beam number in buffer 502 for the appropriate time slot, or traffic channel.

At step 584, it is determined whether provisional beam selection 516 should be verified. In one embodiment, this determination is made by beam selection verification module 514 based on relevant signaling information 180 received from signaling information monitoring system 106. If it is determined that provisional beam selection 516 should be verified, provisional beam selection 516 is selected as uplink smart decision beam selection 506 at step 586. If it is determined that provisional beam selection 516 should not be verified, beam selection verification module 514 selects an appropriate uplink smart decision beam selection 506 based at least in part on relevant signaling information 180.

Whether or not provisional beam selection 516 is verified, the method returns to step 572 to continue sampling the correlation quality 508 and signal strength 438 of each uplink beam 130 in order to repetitively determine the quality factor 550 of each uplink beam 130. In this manner, the method continues to communicate newly determined best quality beam numbers 552 to buffer 502 which may in turn update provisional beam selection 516 if appropriate.

Figure 19:
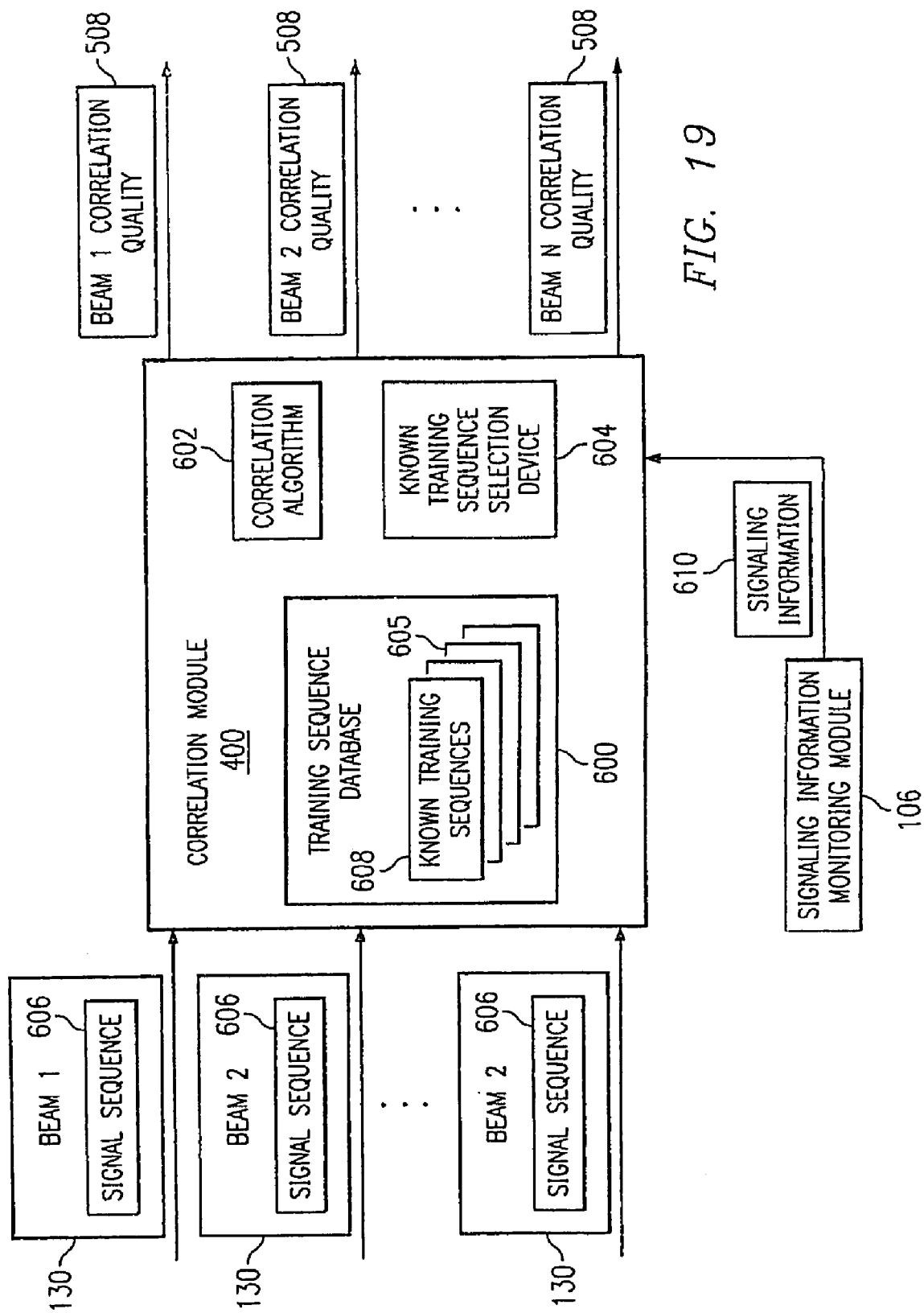
FIG. 19 illustrates a correlation module for determining a correlation quality of each uplink beam for use in determining smart decision beam selections in accordance with an embodiment of the present invention.
Figure 20:
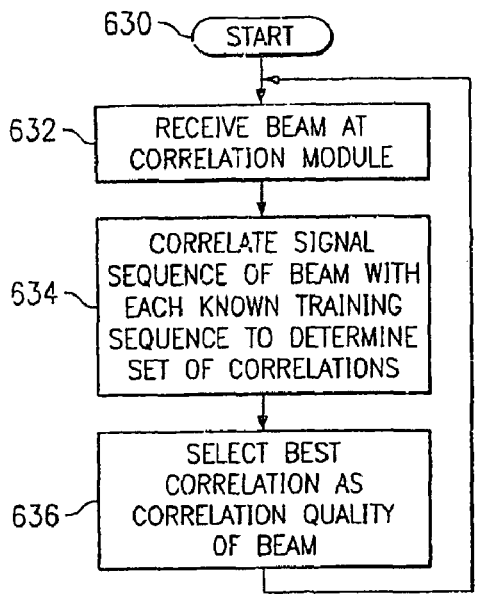
FIG. 20 illustrates a method for determining a correlation quality uplink beams by correlating a signal sequence in each uplink beam with one or more known training sequences in accordance with an embodiment of the present invention.
Figure 21:
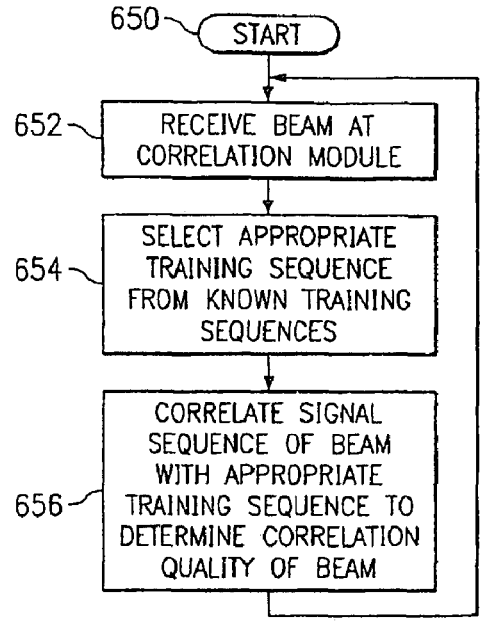
FIG. 21 illustrates a method for determining a correlation quality uplink beams by correlating a signal sequence in each uplink beam with one or more known training sequences in accordance with an embodiment of the present invention.

FIGS. 19 through 21 illustrate a system and method for determining correlation qualities 508 of uplink beams 130 for use in determining a quality factor 550 of each uplink beam 130.

FIG. 19 illustrates correlation module 400 in accordance with an embodiment of the present invention. Correlation module 400 may include a training sequence database 600, a correlation algorithm 602, and a known training sequence selection device 604. Training sequence database 600 comprises one or more known training sequences 608. In particular, training sequence database 600 may include each known training sequence 608 used in the appropriate communications standard. For example, in one embodiment, each known training sequence 608 is one of the training sequences defined in GSM standard 05.02, after being modulated by MSK (Minimum Shift Keying) modulation. Known training sequence selection device 604 is generally operable to determine one or more appropriate training sequences 605 from the group of known training sequences 608 stored in training sequence database 600 with which each uplink beam 130 should be correlated, as discussed below in greater detail.

Correlation module 400 is generally operable to correlate received beam signals with known signals to determine the quality of the received signals. In particular, correlation module 400 is operable to execute correlation algorithm 602 to correlate a signal sequence 606 received via each uplink beam 130 with one or more known training sequences 608 in order to determine a correlation quality 508 of each uplink beam 130. Correlation algorithm 602 generally determines the similarity between a particular signal sequence 606 and one or more known training sequences 608. For example, correlation algorithm 602 may compare a signal sequence 606 with a known training sequences 608 to determine the number of differences between the signal sequence 606 and the known training sequences 608. In other words, correlation algorithm

602 may determine the number of errors in each signal sequence 606. In one embodiment, each known training sequence 608 comprises 26 bits, and thus each signal sequence may be found to contain anywhere from 0 to 26 errors when compared with a particular known training sequences 608.

In some embodiments, correlation module 400 determines the correlation quality 508 for that uplink beam 130 by correlating the signal sequence 606 received via each uplink beam 130 with each known training sequence 608. In one such embodiment, the correlation quality 508 for each uplink beam 130 is the best correlation determined between the signal sequence 606 received via that uplink beam 130 and each known training sequence 608.

In other embodiments, correlation module 400 determines the correlation quality for each uplink beam 130 by correlating that uplink beam 130 with one or more appropriate training sequences 605, rather than each of the known training sequences 608. The one or more appropriate training sequences 605 may be selected from the known training sequences 608 by known training sequence selection device 604 based on relevant signaling information 180 received from signaling information monitoring system 106. For example, known training sequence selection device 604 may be operable to determine which mobile station 15 is communicating in a particular time slot based on relevant signaling information 180, and select the known training sequence 608 that is expected to be received from that mobile station 15 as the appropriate training sequence 605.

The correlation qualities 508 determined by correlation module 400 may be used as input by beam selection modules 404 for use in selecting receiving beam selections 126 and/or transmitting beam selections 124. In particular, correlation qualities 508 may be used as input by smart decision beam selection module 410 in determining a quality factor 550 of each uplink beam 130.

In one embodiment, correlation algorithm 602 may determine the correlation quality 508 of each uplink beam 130 as follows:

$$\forall i, j \ \text{CORR}[i, j] = \sum_{n=0}^{N} Y_i(n+j) * \text{Training\_s}^H(N-n) \quad (15)$$

$$\forall i, j \ \text{SUM\_CORR}[i, j] = \sum_{k=0}^{K} \text{CORR}[i, j+k] \quad (16)$$

$$\text{BEST\_CORR}(i) = \max_j \{\text{SUM\_CORR}[i, j]\} \quad (17)$$

Where:

$Y_i(n)$ indicates the received signal from the receiver after it was sampled;

i indicates the number of the beam being analyzed;

j indicates the length of the correlation window, which may be a particular time period or number of frames;

Training_s(n) indicates the expected known training sequence 608;

N indicates the length of each training sequence;

K indicates the maximum number of multi-paths considered by the algorithm;

CORR[i,j] indicates the correlation between the received signal $Y_i(n)$ and the expected known training sequence, Training_s(n); and BEST_CORR(i) indicates the correlation quality 508 of the beam being analyzed.

If the appropriate one of the known training sequences 608 is not known (for example, in an embodiment in which relevant signaling information 180 is not used to determine one or more appropriate training sequences 605), equations (15) through (17) may be repeated for each known training sequence 608. The correlation quality 508, BEST_CORR(i), of the uplink beam 130 being analyzed may then be determined as follows:

$$\text{BEST\_CORR}[i, \text{num}] = \max_j \{\text{SUM\_CORR}[i, j]\} \quad (18)$$

$$\text{BEST\_CORR}(i) = \max_{\text{num}} \{\text{BEST\_CORR}[i, \text{num}]\} \quad (19)$$

In some embodiments, BEST_CORR(i) for each uplink beam 130 may be used by uplink quality factor algorithm 540 as the Corr_Quality parameter in equation (14) above.

FIG. 20 illustrates a method of determining a correlation quality 508 for a particular uplink beam 130 by correlating the signal sequence 606 communicated by the uplink beam 130 with each known training sequence 608. At step 630, the method starts. At step 632, the uplink beam 130 is received by correlation module 400. In one embodiment, uplink beam 130 is received from one of the receiving units 108. At step 634, correlation module 400 correlates signal sequence 606 with each known training sequence 608 to determine a set of correlations including a correlation for each known training sequence 608. In particular, correlation module 400 may execute at least a portion of correlation algorithm 602 to determine the correlation between signal sequence 606 and each known training sequence 608. At step 636, correlation module 400 may determine the correlation quality 508 of uplink beam 130 by determining the best correlation in the set of correlations. The method may then return to step 632 to receive another signal sequence 606 via uplink beam 130. In one embodiment, a new correlation quality 508 is determined for the signal sequence 606 received via uplink beam 130 in each time slot during an ongoing call. It should be understood that the method illustrated in FIG. 20 may be used to determine a correlation quality 508 for each uplink beam 130.

FIG. 21 illustrates a method of determining a correlation quality 508 for a particular uplink beam 130 by correlating the signal sequence 606 communicated by the uplink beam 130 with one appropriate known training sequence 608. At step 650, the method starts. At step 652, the uplink beam 130 is received by correlation module 400. At step 654, known training sequence selection device 604 may select from the known training sequences 608 an appropriate training sequence 605 with which to correlate signal sequence 606. In one embodiment, known training sequence selection device 604 selects appropriate training sequence 605 based on relevant signaling information 180 received from signaling information monitoring system 106. At step 656, correlation module 400 correlates signal sequence 606 with appropriate training sequence 605 selected at step 654 to determine the correlation quality 508 of uplink beam 130. In particular, correlation module 400 may execute at least a portion of correlation algorithm 602 to determine the correlation quality 508 of uplink beam 130. The method may then return to step 652 to receive another signal sequence 606 via uplink beam 130. In one embodiment, a new correlation quality 508 is determined for the signal sequence 606 received via uplink beam 130 in each time slot during an ongoing call. It should be understood that the method illustrated in FIG. 21 may be used to determine a correlation quality 508 for each uplink beam 130.

The method of FIG. 21 may be used to decrease processing time since the signal sequence 606 in each uplink beam 130 is correlated with one known training sequence 608 rather than each known training sequence 608. In particular, the use of relevant signaling information 180 to determine one or more appropriate training sequences 605 decreases the processing time required to determine the correlation quality 508 of each uplink beam 130.

Figure 22:
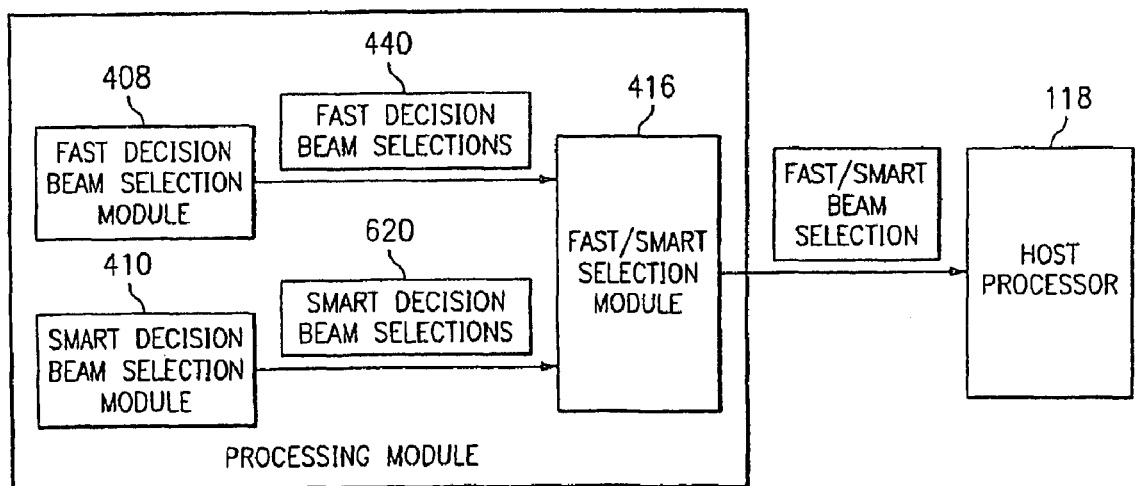
FIG. 22 illustrates a system for determining whether to use a fast decision beam selection or a smart decision beam selection for a particular time slot in accordance with an embodiment of the present invention.
Figure 23:
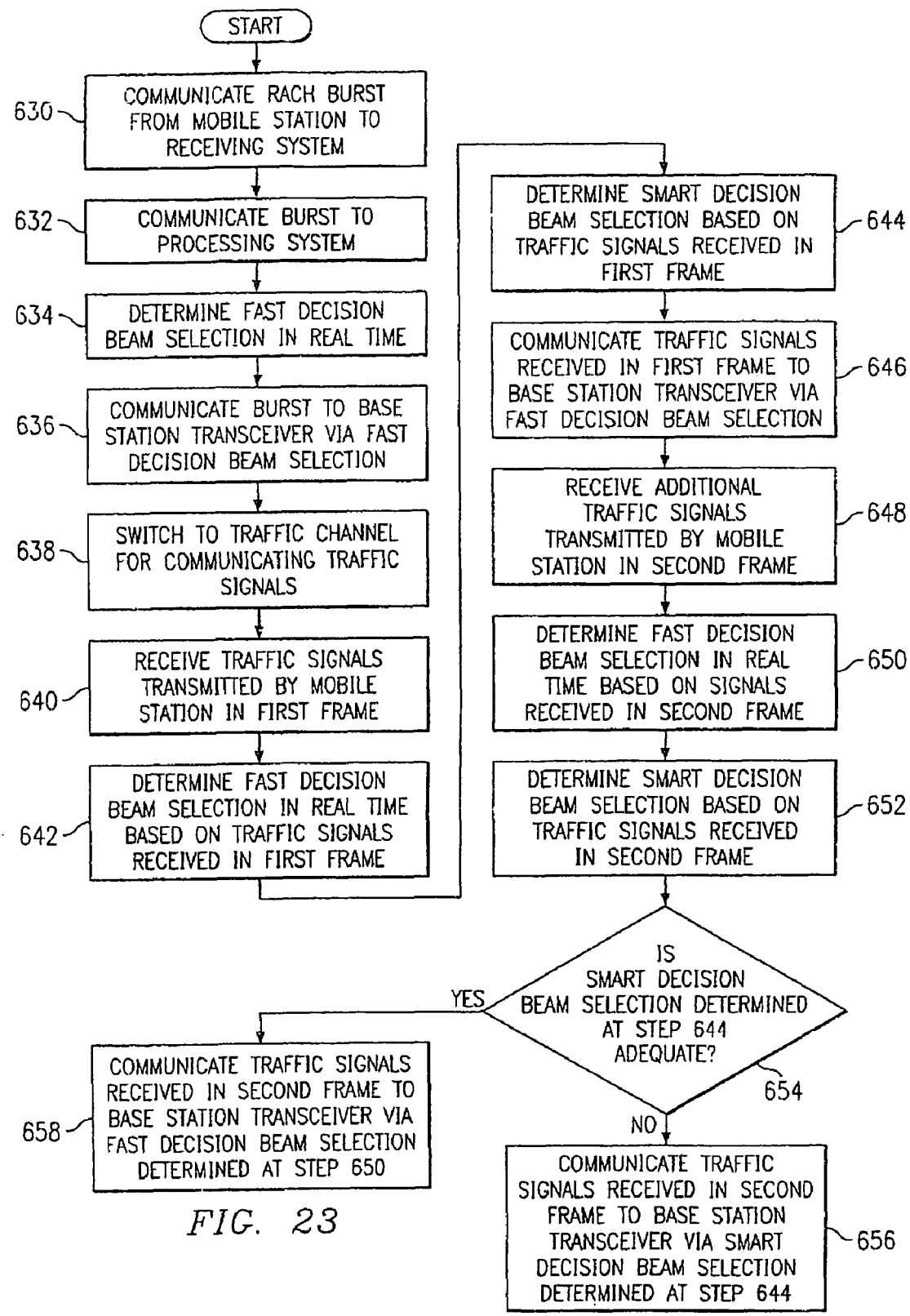
FIG. 23 illustrates a method for determining whether to use a fast decision beam selection or a smart decision beam selection for a particular time slot in accordance with an embodiment of the present invention.

FIGS. 22 and 23 illustrate a system and method for determining whether to select the beam selection determinations made by fast decision beam selection module 408 or smart decision beam selection module 410 in accordance with an embodiment of the present inventions.

FIG. 22 illustrates a system for determining whether to use fast decision beam selection module 408, smart decision beam selection module 410, or neither for selecting an appropriate one or more narrow beams 34 for receiving signals from and/or transmitting signals to one or more mobile station 15. Processing module 62 comprises fast decision beam selection module 408, smart decision beam selection module 410, and fast/smart selection module 416. As discussed above with reference to FIG. 12, fast decision beam selection module 408 is operable to determine fast decision beam selections 440 substantially in real time based on the current frame of signals received via one or more beams. And as discussed above with reference to FIGS. 16 and 17, smart decision beam selection module 410 is operable to determine smart decision beam selections 620, such as uplink and downlink smart decision beam selections 506 and 507, based on both current and previous frames of such signals. In some embodiments, smart antenna apparatus 16 switches to the smart decision beam selections 620 determined by smart decision beam selection module 410 in the frame following the current frame. Thus, in some embodiments, there may be a delay of one or more frames between the frame at which uplink signals are received by smart antenna apparatus 16 and the frame at which smart antenna apparatus 16 switches to the appropriate smart decision beam selections 620. In addition, in some embodiments, since smart decision beam selection module 410 determines smart decision beam selections based on both current and previous frames of signal data, smart decision beam selections 620 are only determined when smart decision beam selection module 410 has information regarding previous frames of the signals being analyzed.

Fast/smart selection module 416 is generally operable to determine whether to select beam selection determinations made by fast decision beam selection module 408, smart decision beam selection module 410, or neither for one or more time slots or frames. Generally, fast decision beam selections 440 are used during the initiation of a call or other communication to or from a mobile station 15 since smart antenna apparatus 16 has little or no prior data regarding the mobile link connection with mobile station 15, and smart decision beam selections 620 are used after the call has been established and smart antenna apparatus 16 has data regarding the location of mobile station 15 from signals received in prior frames. In some embodiments, fast decision beam selections 440 are used for signals received from mobile stations 15 in a random access channel (RACH), such as access request signals. In addition, fast decision beam selections 440 may be used for one or more of initial frames after mobile station 15 has switched to the traffic channel which is used during at least a first portion of the call. In one embodiment, fast decision beam selections 440 are used for RACH signals and for the first time slot after mobile station 15 switches to a traffic channel to support a call, and smart decision beam selections 620 are used for subsequent time slots during the call.

Fast/smart selection module 416 may be a discrete module operable to perform the determine whether to use fast decision beam selections 440 or smart decision beam selections 620 as discussed above, or it may be a distributed system distributed among any number of components of smart antenna apparatus 16, such as fast decision beam selection module 408, smart decision beam selection module 410. For example, in one embodiment, smart decision beam selection module 410 is operable to determine whether to use the smart decision beam selection 620 or the fast decision beam selection 440 for a particular time slot.

The beam selected by fast/smart selection module 416, which is generally a fast decision beam selection 440 or a smart decision beam selection 620, may be referred to as a fast/smart beam selection 622. In some embodiments, fast/smart beam selection 622 is the beam selected for one of the frequencies used by base station transceiver 24. Thus, smart antenna apparatus 16 may determine a fast/smart beam selection 622 for each frequency used by base station transceiver 24. In some embodiments, fast/smart beam selections 622 are further processed by central processing unit 118 before being selected as transmitting beam selection 124 or receiving beam selection 126.

FIG. 23 illustrates a method using fast decision beam selections 440 and smart decision beam selections 620 in smart antenna system 14. At step 630, a random access (RACH) burst is communicated by a mobile station 15 and received by receiving system 100 in a particular time slot of a current frame. The burst is communicated to processing module 62 at step 632. At step 634, fast decision beam selection module 408 determines a fast decision beam selection 440 substantially in real time based on the burst received in the particular time slot of the current frame. At step 636, the burst is communicated to base station transceiver 24 via the beam selected as fast decision beam selection 440.

At step 638, mobile station 15 switches to a traffic channel for communicating voice or other data signals during the call. In particular, mobile station 15 may switch to a particular traffic channel assigned by base station system 12. At step 640, mobile station 15 transmits traffic signals in a first frame of the assigned traffic channel, which are received by receiving system 100 and communicated to processing module 62. At step 642, fast decision beam selection module 408 determines a fast decision beam selection 440 based on the traffic signals (which may include a training sequence) received in the first frame. In particular, fast decision beam selection module 408 may determines fast decision beam selection 440 substantially in real time. At step 644, smart decision beam selection module 410 determines a smart decision beam selection 620 based on the traffic signals received in the first frame. At step 646, the traffic signals received in the first frame are communicated to base station transceiver 24 via the beam selected as fast decision beam selection 440. The determination of smart decision beam selection 620 at step 644 may not be completed until after the traffic signals are communicated to base station transceiver 24 at step 646.

At step 648, mobile station 15 transmits additional traffic signals in a second frame of the assigned traffic channel, which are received by receiving system 100 and communicated to processing module 62. At step 650, fast decision beam selection module 408 determines a fast decision beam selection 440 based on the traffic signals received in the second frame. At step 652, smart decision beam selection module 410 determines a smart decision beam selections 620 based on the traffic signals received in the second frame along with signals received in one or more frames prior to the second frame (which may or may not include the first frame). At step 654, it is determined whether the smart decision beam selection 620 determined at step 644 meets a particular criteria. For example, in one embodiment it is determined whether the quality of smart decision beam selection 620 determined at step 644 meets a particular threshold. If it is determined that the smart decision beam selection 620 determined at step 644 does meet the particular criteria, at step 656 the traffic signals received in the second frame are communicated to base station transceiver 24 via the beam selected as smart decision beam selection 620 at step 644. If it is determined that the smart decision beam selection 620 determined at step 644 does not meet the particular criteria, at step 658 the traffic signals received in the second frame are communicated to base station transceiver 24 via the beam selected as fast decision beam selection 440 at step 650.

Steps 648 through 658 may be repeated one or more times. In particular, steps 648 through 658 may be repeated in order to continually update smart decision beam selection 620 during the remainder of the call. In addition, in some situations, steps 640 through 646 may be repeated one or more times before using a smart decision beam selection 620. In particular, steps 640 through 646 may be repeated one or more times until smart decision beam selection module 410 has sufficient data to determine an adequate smart decision beam selection 620.

Smart antenna system 14 may provide a number of advantages. For example, in some embodiments, smart antenna apparatus 16 may be coupled to a new or existing base station transceiver as an add-on or applique without having to modify, alter, or reconfigure the base station transceiver or any other component of the base station system, such as base station controllers. Thus, the cost and labor of modifying or altering base station system 12 and/or dealing or negotiating with the manufacturer of the components of base station system 12, such as base station transceiver 24 and base station controller 26, is eliminated in some embodiments. Moreover, smart antenna apparatus 16 may be compatible with base station transceivers produced by a variety of manufacturers. For example, smart antenna apparatus 16 may be compatible with all base station transceivers using standard base station transceiver interfaces. For at least the reasons discussed above, the installation costs of smart antenna apparatus 16 are reduced as compared with traditional smart antenna systems. Moreover, the operating costs of smart antenna apparatus 16 are reduced as compared with traditional smart antenna systems.

In addition, the presence and operation of smart antenna apparatus 16 may be transparent to the base station system, including the base station transceiver. In other words, smart antenna apparatus 16 causes little delay (and in some embodiments, no delay) in the reception and transmission of radio signals to and from the base station transceiver. Thus, smart antenna apparatus 16 may operate without affecting the timing of the cellular network or any mobile stations.

In addition, the beam selection systems and methods provided by smart antenna apparatus 16 as described above with reference to FIGS. 11 through 23 may provide a number of advantages. For example, smart antenna apparatus 16 may reduce the interference, such as multi-path and co-channel interference, associated with uplink signals received by a new or existing base station transceiver. In addition, smart antenna apparatus 16 may reduce the interference associated with downlink signals received by mobile stations. Thus, smart antenna apparatus 16 may increase the effective capacity and improve the overall performance of the base station transceiver without requiring any modifications to the base station transceiver. For example, since using narrow beams generally increases the range (or coverage) of effective reception and transmission as compared with wide beams, smart antenna apparatus 16 may increase the range of the base station transceiver to which it is added. Moreover, smart antenna apparatus 16 may improve the signal-to-noise ratio (SNR) of transmitted and/or received signals, and thus increases the data rate which may be transmitted and/or received by the base station transceiver.

In some embodiments, smart antenna apparatus 16 may reduce the interference associated with received and/or transmitted signals better then traditional smart antenna systems. As a result, smart antenna apparatus 16 may provide increased capacity, coverage, and efficiency as compared with traditional smart antenna systems.

Although embodiments of the invention and their advantages are described in detail, a person of ordinary skill in the art could make various alterations, additions, and omissions without departing from the spirit and scope of the present invention as defined by the appended claims.

What is claimed is:

1. A method of selecting an uplink beam as an uplink smart decision beam selection, comprising:
   receiving a plurality of uplink beams;
   determining a correlation quality for each uplink beam in the plurality of uplink beams by correlating signal sequences received in the uplink beam with a known training sequence;
   determining a quality factor for each uplink beam in the plurality of uplink beams, wherein the quality factor for each uplink beam is based on the correlation quality and a signal strength for the uplink beam;
   determining a provisional beam of the plurality of uplink beams, based on the quality factors for the plurality of uplink beams;
   verifying the provisional beam; and
   responsive to verifying the provisional beam, selecting the provisional beam as the uplink smart decision beam selection.

2. The method of claim 1, wherein determining a provisional beam comprises:
   determining a best quality beam number for the plurality of uplink beams, based on the quality factors for the plurality of uplink beams; and
   determining the provisional beam based on the best quality beam number.

3. The method of claim 2, wherein the best quality beam number is a beam number of an uplink beam having the highest quality factor.

4. The method of claim 1, further comprising:
   responsive to not verifying the provisional beam selection, selecting the uplink smart decision beam selection based on signaling information.

5. The method of claim 1, wherein determining a quality factor for each uplink beam in the plurality of uplink beams comprises use of a quality factor algorithm that utilizes one or more uplink weights for each uplink beam in the plurality of uplink beams to determine the quality factor for the uplink beam.

6. The method of claim 5, wherein the one or more uplink weights for each uplink beam in the plurality of uplink beams comprises an uplink correlation quality weight based on the correlation quality of the uplink beam.

7. The method of claim 5, wherein the one or more uplink weights for each uplink beam in the plurality of uplink beams comprises an uplink signal strength weight based on the signal strength of the uplink beam.

8. The method of claim 1, wherein determining the quality factor for each uplink beam comprises determining the quality factor for each uplink beam based on correlation qualities determined at one or more prior time slots of the uplink beam and signal strengths determined at the one or more prior time slots of the uplink beam.

9. The method of claim 8, wherein the quality factor for each beam is determined by taking a weighted sum of both the correlation qualities determined at the one or more prior time slots of the uplink beam and the signal strengths determined at the one or more prior time slots of the uplink beam.

10. The method of claim 1, further comprising: storing the correlation quality for each uplink beam in the plurality of uplink beams in a parameter database.

11. The method of claim 1, further comprising: storing the signal strength for each uplink beam in the plurality of uplink beams in a parameter database.

12. The method of claim 1, wherein at least some of the plurality of uplink beams comprise signals transmitted by a mobile station.

13. The method of claim 1, wherein receiving the plurality of uplink beams comprises:
  receiving one or more input signals at a smart antenna array; and
  at a beam forming network, forming each uplink beam in the plurality of uplink beams based on the received one or more input signals.

14. A smart antenna apparatus, comprising:
  a receiving unit configured to receive one or more beam signals, wherein the one or more beam signals each comprise at least one input signal received at a smart antenna array, and wherein the one or more beam signals are formed at a beam forming network;
  a plurality of beam analysis modules configured to determine signal strengths of the one or more beam signals and to determine correlation qualities of the one or more beam signals; and
  a smart decision beam selection module coupled with the plurality of beam analysis modules, configured to select an uplink smart decision beam selection from the one or more beam signals based on the signal strengths and the correlation qualities.

15. The smart antenna apparatus of claim 14, wherein the receiving unit is further configured to receive the one or more beam signals at a given frequency.

16. The smart antenna apparatus of claim 14, further comprising a storage module coupled to the plurality of beam analysis modules and configured to store one or more signal strengths and one or more correlation qualities.

17. The smart antenna apparatus of claim 16, wherein the smart decision beam selection module is further configured to select the uplink smart decision beam selection based on the stored one or more signal strengths and the stored one or more correlation qualities.

18. A smart antenna apparatus, comprising:
  means for receiving one or more beam signals, wherein the one or more beam signals each comprise at least one input signal received at a smart antenna array, and wherein the one or more beam signals are formed at a beam forming network;
  means for beam analysis configured to determine signal strengths of the one or more beam signals and to determine correlation qualities of the one or more beam signals; and
  means for smart decision beam selection, coupled with the means for beam analysis, configured to select an uplink smart decision beam selection from the one or more beam signals based on the signal strengths and the correlation qualities.

19. The smart antenna apparatus of claim 14, wherein the means for receiving one or more beam signals is further configured to receive one or more beam signals at a given frequency.

20. The smart antenna apparatus of claim 14, further comprising storage means coupled to the plurality of means for beam selection and to the means for smart decision beam selection, configured to store one or more signal strengths and one or more correlation qualities, wherein the means for smart decision beam selection is further configured to select the uplink smart decision beam selection based on the stored one or more signal strengths and one or more correlation qualities.

* * * * *